(12) United States Patent
Fox

(10) Patent No.: US 9,796,447 B2
(45) Date of Patent: *Oct. 24, 2017

(54) GAS SPRING CURVE CONTROL IN AN ADJUSTABLE VOLUME GAS PRESSURIZED DEVICE

(75) Inventor: Robert C. Fox, Los Gatos, CA (US)

(73) Assignee: Fox Factory, Inc., Scotts Valley, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 13/100,129

(22) Filed: May 3, 2011

(65) Prior Publication Data

US 2011/0204549 A1    Aug. 25, 2011

Related U.S. Application Data

(63) Continuation of application No. 11/560,403, filed on Nov. 16, 2006, now Pat. No. 8,464,850, and a
(Continued)

(51) Int. Cl.
| | | |
|---|---|---|
| F16F 9/34 | (2006.01) |
| B62K 25/08 | (2006.01) |
| F16F 9/06 | (2006.01) |
| F16F 9/43 | (2006.01) |
| F16F 9/46 | (2006.01) |
| B62K 25/04 | (2006.01) |

(52) U.S. Cl.
CPC .............. *B62K 25/08* (2013.01); *F16F 9/068* (2013.01); *F16F 9/43* (2013.01); *F16F 9/462* (2013.01); *B62K 2025/048* (2013.01)

(58) Field of Classification Search
CPC ... F16F 9/462; F16F 9/068; F16F 9/43; B62K 25/08; B62K 2025/048
USPC .............. 188/299.1, 278, 322.13; 267/64.11, 267/64.28, 64.25
See application file for complete search history.

(56) References Cited

U.S. PATENT DOCUMENTS

| | | |
|---|---|---|
| 865,151 A | 9/1907 | Andrew |
| 1,094,567 A | 4/1914 | Hofmann |
| (Continued) | | |

FOREIGN PATENT DOCUMENTS

| | | |
|---|---|---|
| DE | 725 659 | 9/1942 |
| DE | 1 455 159 | 3/1969 |
| (Continued) | | |

OTHER PUBLICATIONS

Remote Adjustable Air Chamber (Risse Racing) (1999/2005) (2 pages).
(Continued)

*Primary Examiner* — Bradley King
(74) *Attorney, Agent, or Firm* — Patterson & Sheridan, LLP; David M. Haugen

(57) ABSTRACT

A gas spring curve control valve for a adjustable-volume gas-pressurized device is described. The valve allows for selection from among at least four spring curves and can be packaged in small spaces/devices. In an exemplary embodiment of the invention, a rotary cam having grooves and lobes that interact with spring loaded ball bearings and an external adjuster knob are used to easily change the gas spring curve "on-the-fly" and with minimal user effort.

27 Claims, 18 Drawing Sheets

Related U.S. Application Data continuation-in-part of application No. 12/768,523, filed on Apr. 27, 2010, now Pat. No. 8,752,681, which is a continuation of application No. 10/237,333, filed on Sep. 5, 2002, now Pat. No. 7,703,585.

(60) Provisional application No. 60/391,991, filed on Jun. 25, 2002, provisional application No. 60/392,802, filed on Jun. 28, 2002.

(56) References Cited

U.S. PATENT DOCUMENTS

| | | |
|---|---|---|
| 1,946,882 A | 2/1934 | Russel |
| 1,984,144 A | 12/1934 | Laugaudin |
| 1,992,490 A | 2/1935 | Lewis |
| 2,528,822 A | 11/1950 | Dunn |
| 2,894,742 A | 7/1959 | Peterson |
| 3,001,538 A | 9/1961 | Du Bois |
| 3,085,771 A | 4/1963 | Peterson |
| RE29,055 E | 11/1976 | Wagner |
| 4,206,934 A | 6/1980 | McKee |
| 4,273,310 A | 6/1981 | Ginzler |
| 4,390,159 A | 6/1983 | Duncan |
| 4,452,177 A | 6/1984 | Plett |
| 4,457,340 A | 7/1984 | Krueger |
| 4,534,580 A | 8/1985 | Kobayashi et al. |
| 4,558,587 A | 12/1985 | Fruzzetti |
| 4,592,540 A | 6/1986 | Yokoya et al. |
| 4,598,929 A | 7/1986 | Kumagai et al. |
| 4,613,116 A | 9/1986 | Buma |
| 4,616,811 A | 10/1986 | Buma |
| 4,629,170 A | 12/1986 | Warmuth, II |
| 4,635,906 A | 1/1987 | Buma |
| 4,651,977 A | 3/1987 | Buma |
| 4,653,735 A | 3/1987 | Buma |
| 4,659,070 A | 4/1987 | Buma |
| 4,660,810 A | 4/1987 | Buma |
| 4,666,135 A | 5/1987 | Buma et al. |
| 4,667,696 A | 5/1987 | van Rensburg |
| 4,673,171 A | 6/1987 | Buma |
| 4,697,796 A | 10/1987 | Kitamura et al. |
| 4,735,401 A | 4/1988 | Buma et al. |
| 4,746,106 A | 5/1988 | Fukumura |
| 4,768,758 A | 9/1988 | Buma |
| 4,773,635 A | 9/1988 | Buma |
| 4,828,464 A | 5/1989 | Maier et al. |
| 4,838,306 A | 6/1989 | Horn et al. |
| 4,844,428 A | 7/1989 | Margolis et al. |
| 5,037,062 A | 8/1991 | Neuhaus |
| 5,067,517 A | 11/1991 | Ting-Chih et al. |
| 5,067,518 A | 11/1991 | Kosmyna |
| 5,111,735 A | 5/1992 | Johnson |
| 5,279,480 A | 1/1994 | Derrien |
| 5,306,122 A | 4/1994 | Gebauer et al. |
| 5,346,236 A | 9/1994 | Ohma |
| 5,413,316 A | 5/1995 | Easter |
| 5,428,533 A | 6/1995 | Ogawa |
| 5,449,188 A | 9/1995 | Ohma |
| 5,470,090 A | 11/1995 | Stewart et al. |
| 5,538,276 A | 7/1996 | Tullis |
| 5,725,226 A | 3/1998 | Cabrerizo-Pariente |
| 5,775,677 A | 7/1998 | Englund |
| 5,915,674 A | 6/1999 | Wolf et al. |
| 5,921,572 A | 7/1999 | Bard et al. |
| 5,957,252 A | 9/1999 | Berthold |
| 6,010,119 A | 1/2000 | Hsiao |
| 6,050,583 A | 4/2000 | Bohn |
| 6,073,736 A | 6/2000 | Franklin |
| 6,095,541 A | 8/2000 | Turner et al. |
| 6,105,988 A | 8/2000 | Turner et al. |
| 6,135,434 A | 10/2000 | Marking |
| 6,149,125 A | 11/2000 | Nilsson |
| 6,149,174 A | 11/2000 | Bohn |
| 6,254,067 B1 | 7/2001 | Yih |
| 6,311,962 B1 | 11/2001 | Marking |
| 6,340,153 B1 | 1/2002 | Miesner |
| 6,343,807 B1 | 2/2002 | Rathbun |
| 6,464,201 B2 | 10/2002 | Job |
| 6,505,719 B2 | 1/2003 | Gonzalez et al. |
| 6,508,460 B2 | 1/2003 | Job |
| 6,543,799 B2 | 4/2003 | Miyoshi |
| 6,592,136 B2 | 7/2003 | Becker et al. |
| 6,595,537 B2 | 7/2003 | Miyoshi |
| 6,612,599 B2 | 9/2003 | Miyoshi |
| 6,619,684 B2 | 9/2003 | Miyoshi |
| 6,669,219 B2 | 12/2003 | Turner et al. |
| 6,688,626 B2 | 2/2004 | Felsl et al. |
| 6,698,730 B2 | 3/2004 | Easter |
| 6,698,780 B2 | 3/2004 | Miyoshi |
| 6,708,803 B2 | 3/2004 | Jensen |
| 6,708,999 B1 | 3/2004 | Baltes et al. |
| 6,824,146 B2 | 11/2004 | Kang |
| 6,824,154 B1 | 11/2004 | Turner |
| 6,863,291 B2 | 3/2005 | Miyoshi |
| 6,883,810 B2 | 4/2005 | Svartz et al. |
| 6,938,887 B2 | 9/2005 | Achenbach |
| 6,974,001 B2 | 12/2005 | Bauman |
| 6,978,872 B2 | 12/2005 | Turner |
| 6,991,621 B2 | 1/2006 | Bacher et al. |
| 7,000,907 B2 | 2/2006 | Achenbach |
| 7,011,193 B2 | 3/2006 | Lemmens et al. |
| 7,017,893 B1 | 3/2006 | Vincenzo F. |
| 7,441,638 B2 | 10/2008 | Hanawa |
| 7,870,936 B2 * | 1/2011 | Shipman .................. 188/299.1 |
| 7,963,509 B2 | 6/2011 | Fox |
| 2003/0234144 A1 | 12/2003 | Fox |
| 2004/0262879 A1 | 12/2004 | Kinzler et al. |
| 2005/0012255 A1 | 1/2005 | Denk |
| 2005/0116399 A1 | 6/2005 | Jordan et al. |
| 2007/0057420 A1 | 3/2007 | Jordan |

FOREIGN PATENT DOCUMENTS

| | | |
|---|---|---|
| DE | 3233160 | 3/1984 |
| DE | 4018712 | 12/1991 |
| DE | 10236621 | 3/2004 |
| DE | 102004021586 | 12/2005 |
| EP | 0 101 589 | 2/1984 |
| EP | 0 164 189 | 12/1985 |
| EP | 0 166 702 | 1/1986 |
| EP | 0 474 171 | 3/1992 |
| EP | 1 464 866 | 10/2004 |
| ES | 8608123 | 6/1985 |
| FI | 931949 | 4/1993 |
| FR | 1.174.491 | 3/1959 |
| FR | 2 728 948 | 7/1996 |
| FR | 2 753 510 | 3/1998 |
| FR | 2 800 702 | 5/2001 |
| FR | 2 863 328 | 6/2005 |
| GB | 835151 | 5/1960 |
| GB | 2 265 435 | 9/1993 |
| IT | 01237933 | 6/1993 |
| IT | 01247985 | 1/1995 |
| JP | 57-18509 | 1/1982 |
| JP | 59-26639 | 2/1984 |
| JP | 61-135808 | 6/1986 |
| JP | 61-235212 | 10/1986 |
| JP | 7-167189 | 7/1995 |
| SU | 623759 | 9/1978 |
| WO | WO 99/10223 A1 | 3/1999 |
| WO | WO03/029687 A1 | 4/2003 |
| WO | WO 2004/016966 A1 | 2/2004 |
| WO | WO 2004/041563 A1 | 5/2004 |

OTHER PUBLICATIONS

Rick Sieman, Do it Yourself Tech-Dial in Your Own Forks (www.off-road.com/dirtbike/tech/forks) (Jul. 1, 2005) (6 pages).

How to Improve the Ride and Suspension Performance of Cruiser Motorcycles (2006) (6 pages).

Rock Shox SID Manuals (1998-2000) (15 pages).

Jack Gieck, Riding on Air: A History of Air Suspension, p. 222 (1999) (2 pages).

(56) References Cited

OTHER PUBLICATIONS

Fox Factory 2008 Aftermarket Catalog re DHX (2 pages).
The History of Fox Air Shocks (2001).

* cited by examiner

To shock absorber

To damper valving

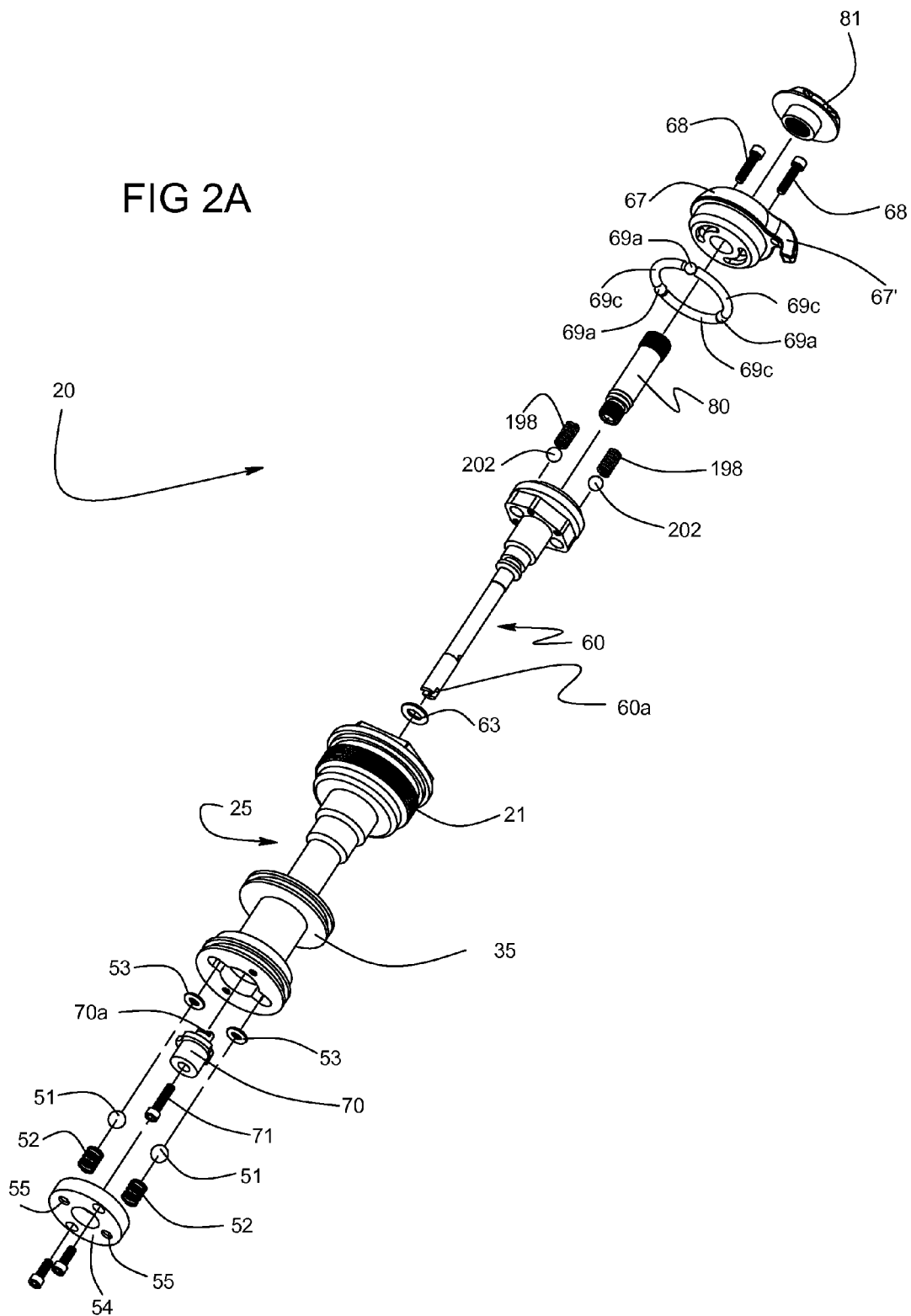

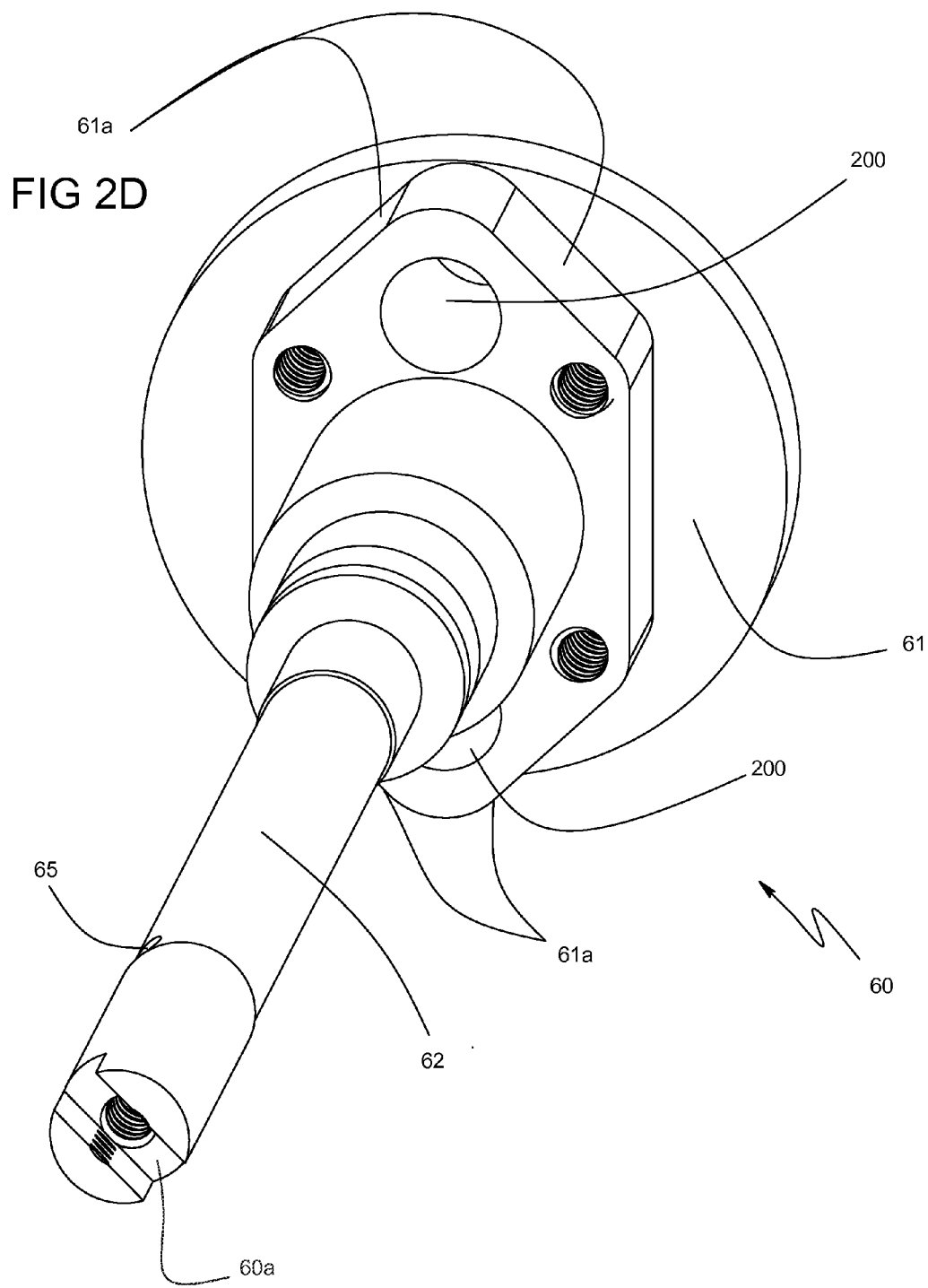

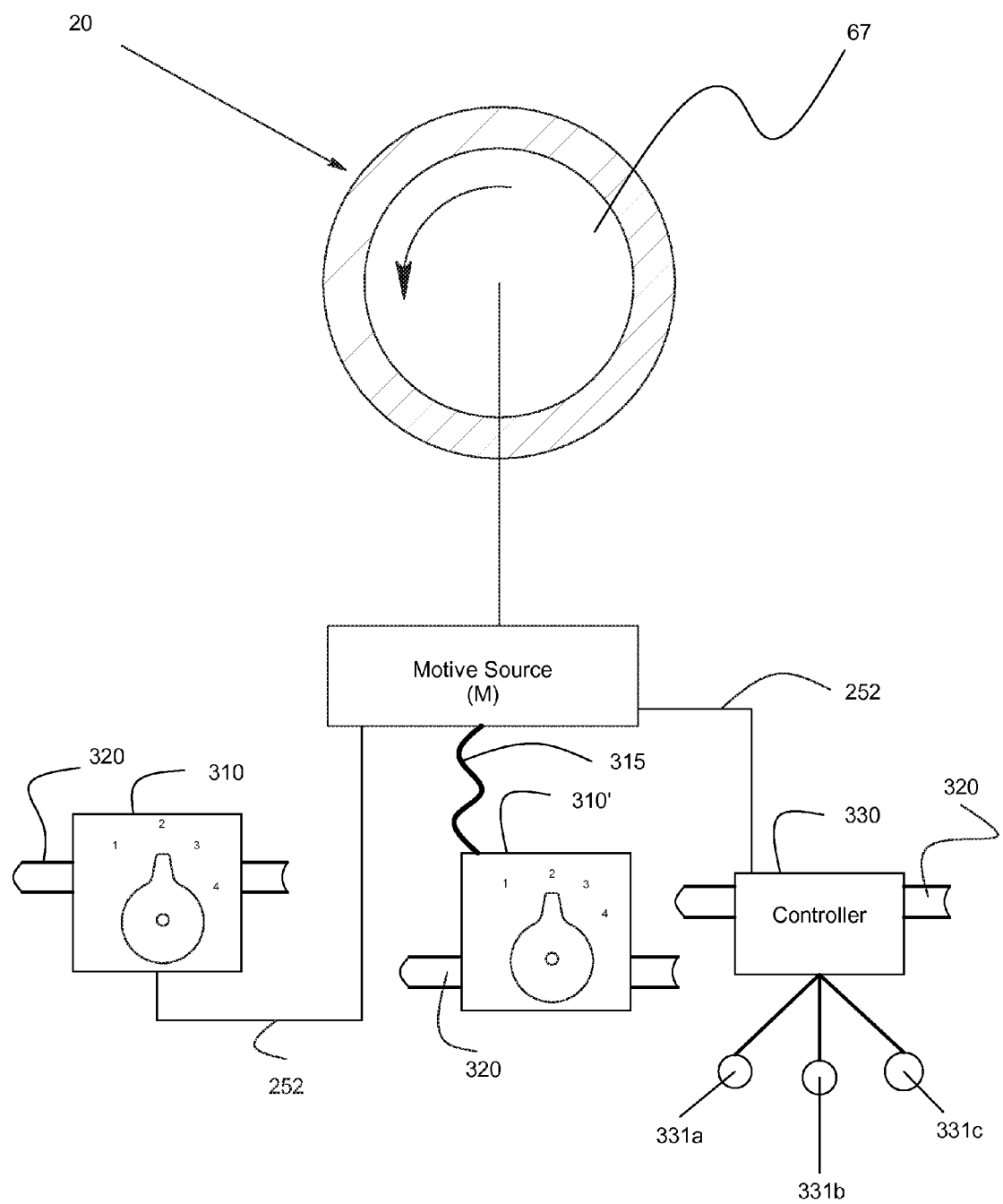

ALL CLOSED

ALL OPEN

FIG 16A     FIG 16B     FIG 16C     FIG 16D
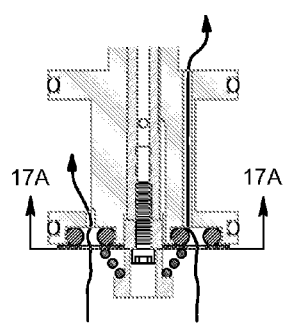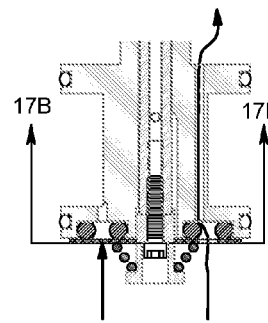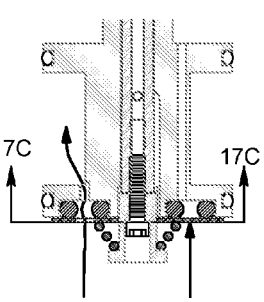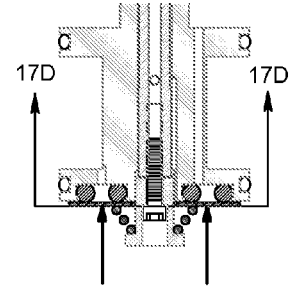
FIG 17A     FIG 17B     FIG 17C     FIG 17D
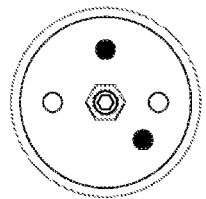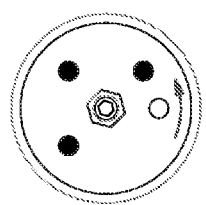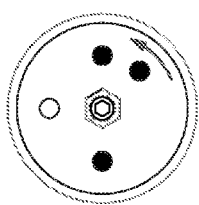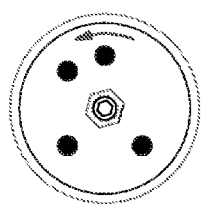

GAS SPRING CURVE CONTROL IN AN ADJUSTABLE VOLUME GAS PRESSURIZED DEVICE

CROSS-REFERENCE TO RELATED APPLICATIONS

This application is a continuation of U.S. patent application Ser. No. 11/560,403, filed Nov. 16, 2006. This application is also a continuation-in-part of U.S. patent application Ser. No. 12/768,523, filed Apr. 27, 2010, which is a continuation of U.S. patent application Ser. No. 10/237,333, filed Sep. 5, 2002, now U.S. Pat. No. 7,703,585, which claims benefit of U.S. provisional patent application Ser. No. 60/391,991, filed Jun. 25, 2002, and U.S. provisional patent application Ser. No. 60/392,802, filed Jun. 28, 2002. Each of the aforementioned related patent applications is herein incorporated by reference.

FIELD OF THE INVENTION

The current invention is directed to improvements useful in gas-spring devices and other variable-volume gas-pressurized devices that operate according to the gas spring characteristics (i.e., pressure v. chamber volume) they produce during operation. For purposes of this patent application, all such devices are collectively referred to herein as adjustable-volume gas-pressurized devices. The current invention is especially directed to providing such devices with the ability to have their gas spring curves easily changed by the rider on-the-fly. The current invention is especially suitable for use with, for example:

(a) gas springs used in two-wheeled vehicles, such as: bicycle shock absorbers (e.g. our '144 application), or bicycle suspension forks (e.g. our U.S. Pat. No. 6,592,136); and b) shock absorbers having a chamber containing a pressurized gas for controlling the pressure on a hydraulic fluid and/or controlling the effect or extent of a pressure-sensitive damping effect, as exemplified by our WO2006/054994.

BACKGROUND OF THE INVENTION

Introduction

Just like any other type of spring, gas springs have spring curves that define the force v. deflection characteristic for the spring. In the field of gas springs and especially those used in vehicles, it is well known that it is often advantageous for the gas spring curve of the gas spring to be able to be changed. Accordingly, our '144 application extensively describes the advantages of a gas spring performing according to a gas spring curve selected—by the rider—from a number of different spring curves (i.e., "softer" and "stiffer"). The need for a gas spring to perform according to a gas spring curve selected—by the rider—from a number of different spring curves (i.e., "softer" and "stiffer") is also generally discussed in the prior art, such as in US Pub 2005/0116399.

It is highly desirable that the gas spring curve of the gas spring should be able to be easily changed by the rider on-the-fly. Typically, for example, in the bicycle arts, a successful "on-the-fly" adjustment should: (1) be able to made without tools; (2) require small controller manipulations (e.g. short angular knob rotations); (3) require low forces/torques to manipulate the controller; and (4) be capable of being made very quickly (for example, in one or two seconds) and without the rider having to stop or dismount.

Discussion of Prior Art

The prior art includes a number of adjustable-volume gas-pressurized devices that, while capable of being adjusted to provide various gas spring curves, are not capable of, or conducive to, easy on-the-fly adjustment.

For example, a number of adjustable gas spring designs require rotating an adjustment cap against a significant amount of torque for a full 360° or more, to change the gas chamber volume. As examples, see, e.g. Risse Racing ("Remote Adjustable Gas Chamber"); Showa (U.S. Pat. No. 5,346,236 and Showa Advertisement, Mountain Bike 22-23 (June 1994)); Berthold (U.S. Pat. No. 5,957,252); Rockshox (U.S. Pat. No. 6,095,541); and SRAM (US Pub. 2005/0116399). (For completeness, we note here that the rotation adjustment described in SRAM '399, besides changing gas chamber volume, also changes total fork travel.)

Additionally, in the DHX 5® shock absorber made by FOX FACTORY, INC., the assignee of the current invention, adjusting the independent bottom-out resistance, which operates according to a gas spring curve as generally described in paragraphs [0079]-[0080] of our WO2006/054994, requires a significant amount of torque to rotate the control knob.

It is also known to those skilled in the art that by changing the volume of the oil in the damper, the air spring response can be adjusted. See e.g. Showa Advertisement (referred to above) (referring to common prior art practice: "Have you ever changed the oil volume in your suspension? Does it take a great deal of your time?"); Rick Sieman, "Do It Yourself Tech—Dial in Your Own Forks" (www.offroad-.com/dirtbike/tech/forks/); "How to Improve the Ride and Suspension Performance of Cruiser Motorcycles" (www-.motorcyclecruiser.com/tech/improve_ride_suspension_performance/); "Suspension Tuning Guide—Learning the Lingo" (www.sportrider.com/tech/146.sub.—0006_lingo). With this method, depressurization of the gas spring is required before the oil may be added or removed and then re-pressurization of the gas spring is required before use.

Other methods that require depressurization and re-pressurization of the gas spring during the course of making the spring curve adjustment are: (a) rotating internal parts using an Allen-wrench (e.g. 1998 Rockshox SID); (b) adding a volume spacer (e.g. 1999-2000 Rockshox SID); and (c) re-locating an internal volume plate (Cane Creek AD-10 and AD-12 rear shocks and U.S. Pat. No. 5,775,677).

When a rider has to exert this much effort and labor to make spring curve adjustments, the gas spring curve adjustment cannot be considered an on-the-fly adjustment—no less a practical on-the-fly adjustment.

As described in our '144 application, spring curves in a gas spring can be changed by altering the initial gas chamber volume. Increasing or decreasing the initial gas chamber volume softens or stiffens, respectively, the gas spring curve. The '144 application describes the theory and formulas underlying how varying gas chamber volumes effects spring curves. Note also that gas springs are sometimes referred to air springs because the gas they use is often air.

Selectively placing main and auxiliary gas chambers in fluid communication with each other to alter the total gas volume subject to compression and therefore the gas spring curve of the gas spring has been widely used in various constructions in automobiles (U.S. Pat. Nos. 1,094,567; 4,206,934; 4,534,580; 4,592,540; 4,598,929; 4,613,116; 4,616,811; 4,635,906; 4,651,977; 4,653,735; 4,659,070;

4,697,796; 4,673,171; 4,735,401; 4,746,106; 4,768,758; 4,773,635; 5,915,674; 6,883,810; 6,698,730; 6,708,803; JP61-1135808; DE 10236621; DE 3233160; and DE 4018712). Additionally, in an automotive application, JP61-1135808 teaches that a main chamber may be used in combination with two remote gas chambers to provide for three different spring curves.

However, the bulky, motor driven, electronically controlled, multi-component, and external (to the gas spring housing) devices disclosed in much of the previously mentioned automotive prior art and used to achieve this functionality are not conducive to un-powered devices, compact and lightweight packaging, and/or incorporation into smaller adjustable-volume gas-pressurized devices, such as used in bicycle or other two-wheeled vehicle suspensions.

Indeed, as compared to the automotive solutions described above, there has been much less success in finding innovative ways to provide two-wheeled vehicle riders with the ability to easily and quickly change the gas spring curve of adjustable-volume gas-pressurized devices on-the-fly. Currently used methods remain labor or effort intensive and not are conducive to on-the-fly adjustment. As mentioned above, the most widely used current two-wheel vehicle solutions involve:

1. Rotating an external knob or nut against significant torque, e.g. Showa; Risse Racing; Rockshox ('541); SRAM ('399); Bethold (U.S. Pat. No. 5,957,252); FOX DHX (WO06/054994);

2. Adding or removing oil after depressurization of the gas spring, e.g. various sources mentioned above;

3. Rotating an internal part to increase or decrease the gas chamber size after depressurization of the gas spring and requiring use of an Allen wrench, e.g. 1998 RockShox SID;

4. Adding a "volume spacer" to increase or decrease the gas chamber size after depressurization of the gas spring, e.g., 1999-2000 RockShox SID; and 5. Re-locating an internal 'Volume Plate' to increase or decrease the gas chamber size after depressurization of the gas spring, e.g., Creek AD-10 and AD-12 rear shocks (See U.S. Pat. No. 5,775,677).

Accordingly, the current invention, as will be described below, provides very practical and simple ways for two-wheeled vehicle riders to have the ability to easily and quickly change the gas spring curve of adjustable-volume gas-pressurized devices on-the-fly.

Damping Forces v. Spring Forces

Recognizing the difference between spring curves and so-called gas damping is important to an appreciation of the current invention relative to the prior art. Gas damping has been defined in at least one source as a damping force that results from gas being forced through "proper" (i.e., smaller) orifices. See Jack Gieck, *Riding on Air: A History of Air Suspension* 222 (1999). See also U.S. Pat. No. 5,775,677 (discussing and suggesting using gas as a damping medium). However, Gieck also writes that the idea that a gas flowing through an orifice can be used to create a damping force has generally been a blind alley and that the perceived damping effect can be explained with the theory that the smaller orifices actually temporarily isolate/separate the gas volumes. See Gieck at 222. While on a purely theoretical level, there may be a question as to whether there really is such a thing as true "gas damping", some in the industry do make reference to and apply such a phenomena. See Rockshox 1998 SID User's Manual ("Air Damping Orifice Adjuster"). Accordingly, if we accept that the term "gas damping" loosely defines a result rather than how that result is achieved, the current invention has widespread applicability, for example in applications:

(a) where large gas-flow orifices that do not introduce a so-called gas damping effect are used, and the gas flows through the valve orifices and from one gas chamber to another with little or no resistance or throttling and virtually instantaneously; or (b) where smaller orifices that may sometimes be described as introducing a so-called gas damping effect may be preferred.

For purposes of the invention, "instantaneous" is considered on the order of milliseconds. For a typical mountain bike air fork operating under normal conditions, e.g., gas chamber volumes, pressures, and temperatures, a gas flow port on the order of about 0.050" diameter or larger will achieve a virtually instantaneous flow. A flow of this nature probably would not be considered to introduce a gas damping effect.

On the other hand, under the same conventional conditions, a gas flow port having a diameter of approximately 0.005", would not result in a virtually instantaneous flow. Rather, it would take, for example, approximately 0.8 seconds for the pressure between the two gas chambers to equalize when such a small flow port is used. For purposes of the invention, a flow that takes "on the order of" 0.8 seconds can be considered to be restricted, throttled and not virtually instantaneous. A flow of this nature probably would be considered to add a gas damping effect.

Therefore, as used herein when describing the various exemplary embodiments of the invention, "fluid communication" means that gas may flow from one gas chamber to another, even if that gas flow is being throttled. "Unrestricted fluid communication" as used in this application means gas flows from one gas chamber to another with little or no resistance or throttling and virtually instantaneously.

Both restricted and unrestricted fluid communication are within the scope of the invention and which is used depends on the specific performance characteristics desired by the user.

Gas Spring Curves, Travel Modes and Compression Ratios

So far, reference has only been made to different gas spring curves. However, as described in the '144 application, the stiffness (gas spring curve) of a gas spring may be associated with "travel modes" and compression ratios. For conciseness and clarity, the extensive background and exemplary calculations provided in the '144 application on these concepts will only be summarized here.

Travel modes, e.g., short travel modes and long travel modes, are generally defined by how far a spring compresses when subjected to a given force. Thus, as described in the '144 application, for a given force, when a gas spring is in short travel mode it compresses less than it would if the gas spring is in long travel mode.

Compression ratio is defined in our '144 application as initial volume of a gas spring (i.e., at full expansion) divided by the final volume of the gas spring (i.e., at full compression). For a given initial pressure, higher compression ratios produce higher pressures at any given travel distance, thus requiring larger forces for compression. Reference should be made to the '144 application for exemplary compression ratio and compressive force calculations.

In the '144 application, the long travel mode is operative and the compression ratio is lowest when the two gas chambers are in fluid communication and the short travel mode is operative and the compression ratio is highest when the two gas chambers are not in fluid communication.

As will be described below, this terminology is applicable to the current invention.

BRIEF DESCRIPTION OF THE DRAWINGS

FIG. 1B depicts a remote reservoir for use with a shock absorber having a gas spring curve control valve according to a first exemplary embodiment of the invention.

FIG. 1C depicts a portion of a monotube De Carbon-type shock absorber including a gas spring curve control valve according to a first exemplary embodiment of the invention FIG. 2A depicts a perspective exploded view of a gas spring curve control valve according to a first exemplary embodiment of the invention.

FIGS. 2B-D depict perspective exploded views of different sub-assemblies of a gas spring curve control valve according to a first exemplary embodiment of the invention

FIG. 11 is a high-level block diagram schematically depicting alternative methods for adjusting the first embodiment of the gas spring curve control valve.

FIGS. 16A-16D depict axial cross-section of the gas spring curve control valve according to FIG. 15A in each of its available settings.

FIGS. 17A-17D are views along lines 17A-D of FIGS. 16A-16D, respectively.

DETAILED DESCRIPTION OF THE INVENTION

Introduction

Figure 1A:
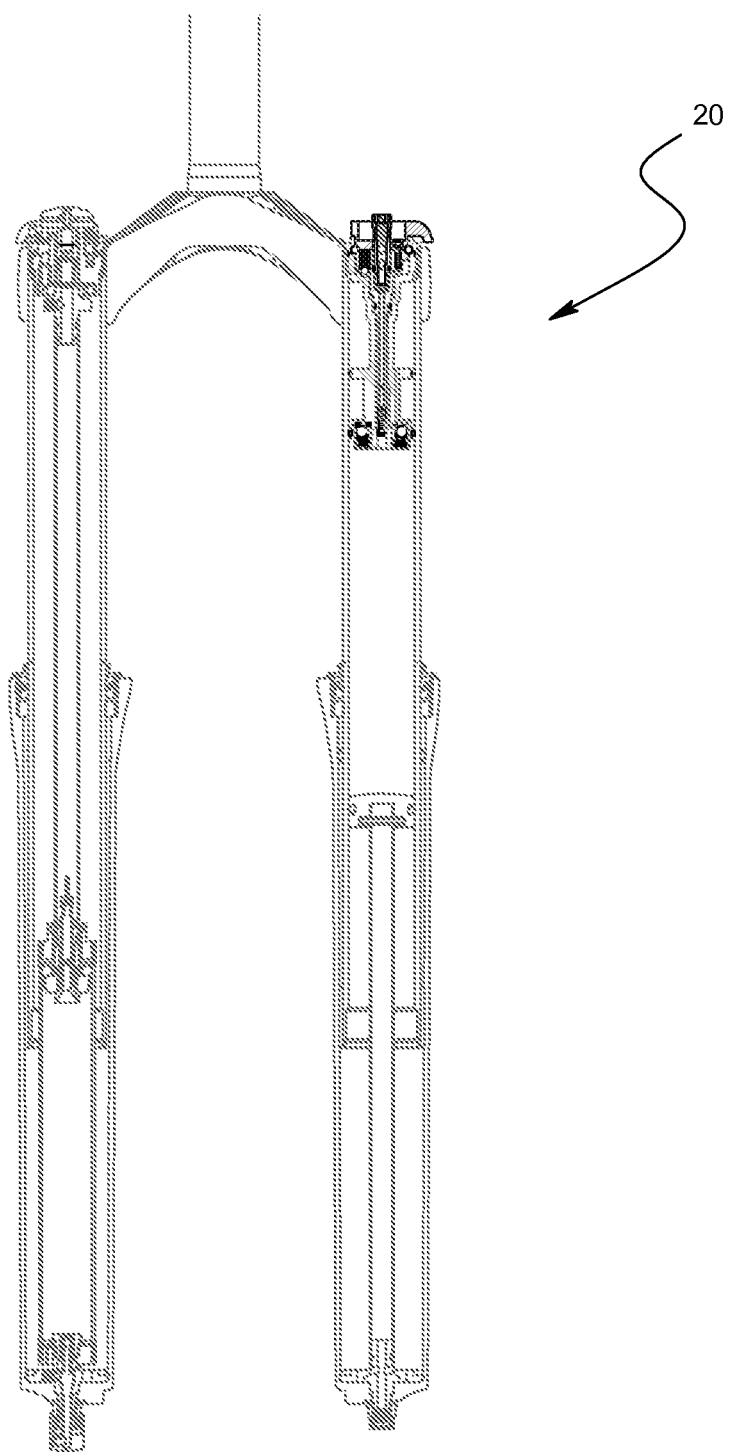
FIG. 1A depicts a suspension fork including a gas spring having a gas spring curve control valve according to a first exemplary embodiment of the invention. The suspension fork may be similar to the suspension fork shown in, for example, our U.S. Pat. No. 6,592,136.
Figure 1B:
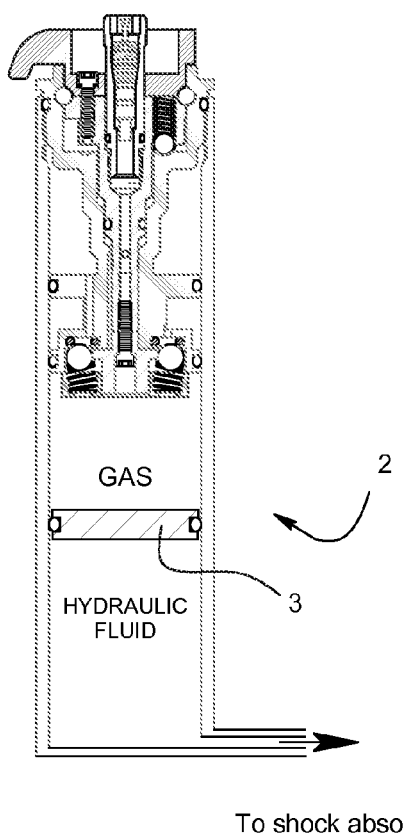
FIGS. 1B and 1C depict portions of shock absorbers including a chamber containing a pressured-gas and having a gas spring curve control valve according to a first exemplary embodiment of the invention. In particular.
Figure 1C:
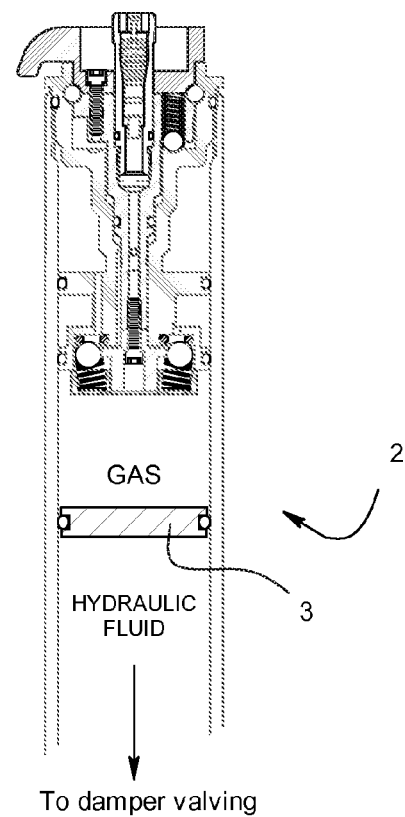

As previously mentioned, the concepts underlying the gas spring curve control valve 20 according to the various exemplary embodiments of the invention have widespread applicability. However, the concepts are especially applicable to bicycle suspension forks (e.g. FIG. 1A) or bicycle shock absorbers having gas springs (the '144 application) or hydraulic shock absorbers 2 having a chamber containing pressurized gas for pressurizing a hydraulic fluid and, in which, the pressurized gas and hydraulic fluid may be separated by an internal floating piston 3 (FIGS. 1B, 1C) or some other type of barrier such as a bladder or diaphragm (not shown). Due to the fact that the gas spring curve control valve 20 according to the invention has such wide-spread applicability and may be easily retrofitted into many existing devices, the specific details of the various adjustable-volume gas-pressurized devices to which the invention may be applied are only shown schematically herein. Reference should be made to any of the various patents and patent applications cited herein for extensive background that will not be repeated herein to maintain clarity and conciseness.

Basic Structure of an Exemplary Embodiment

Figure 3:
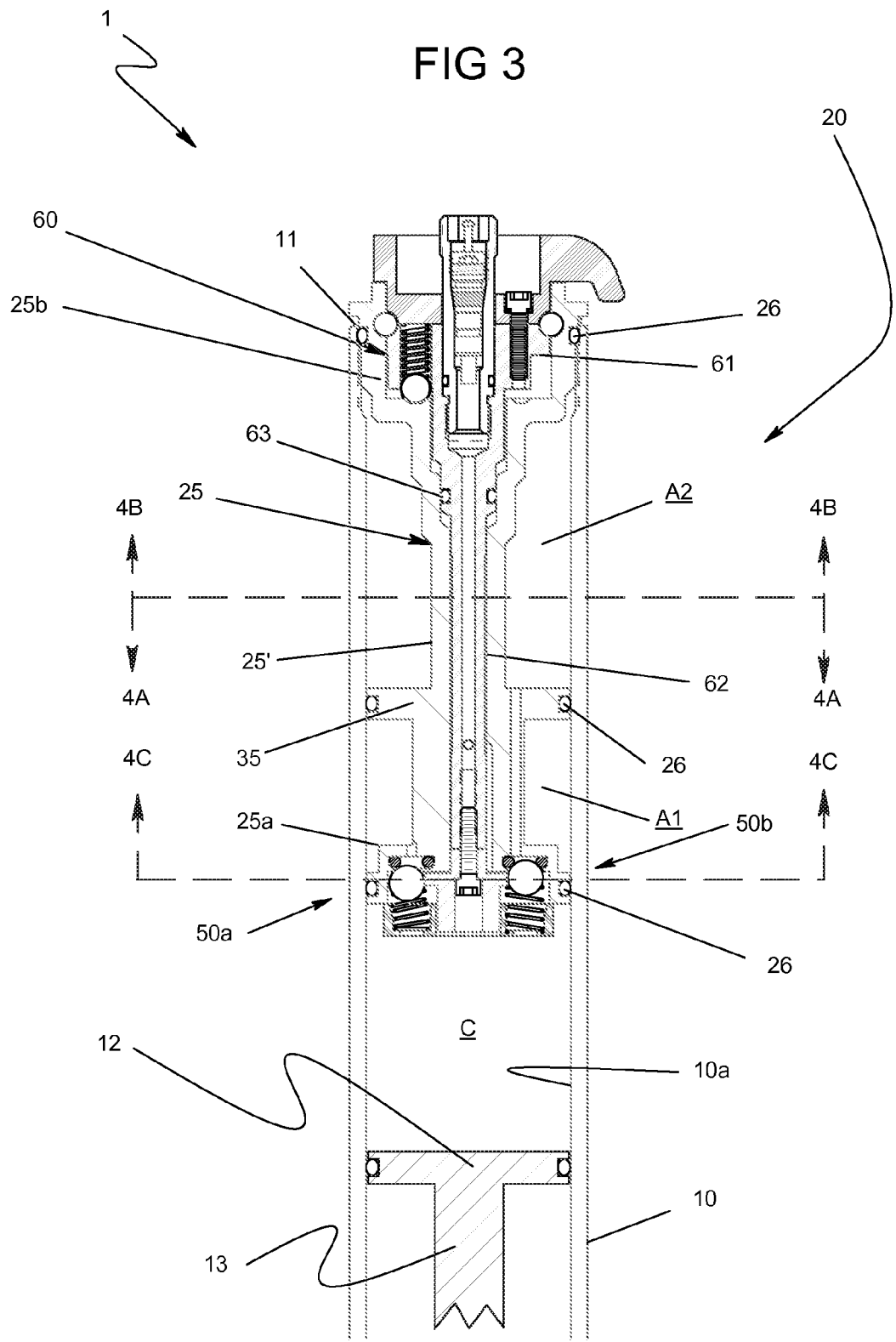
FIG. 3 depicts a cross-section view of generic adjustable-volume gas-pressurized device including a gas spring curve control valve according to a first exemplary embodiment of the invention.

Thus, FIG. 3 depicts an overall view of an exemplary embodiment of a gas spring curve control valve 20 associated with a generic self-contained adjustable-volume gas-pressurized device 1 (e.g., shock absorber gas spring, fork gas spring, shock absorber reservoir, etc.) having a generic housing 10.

Figure 2B:
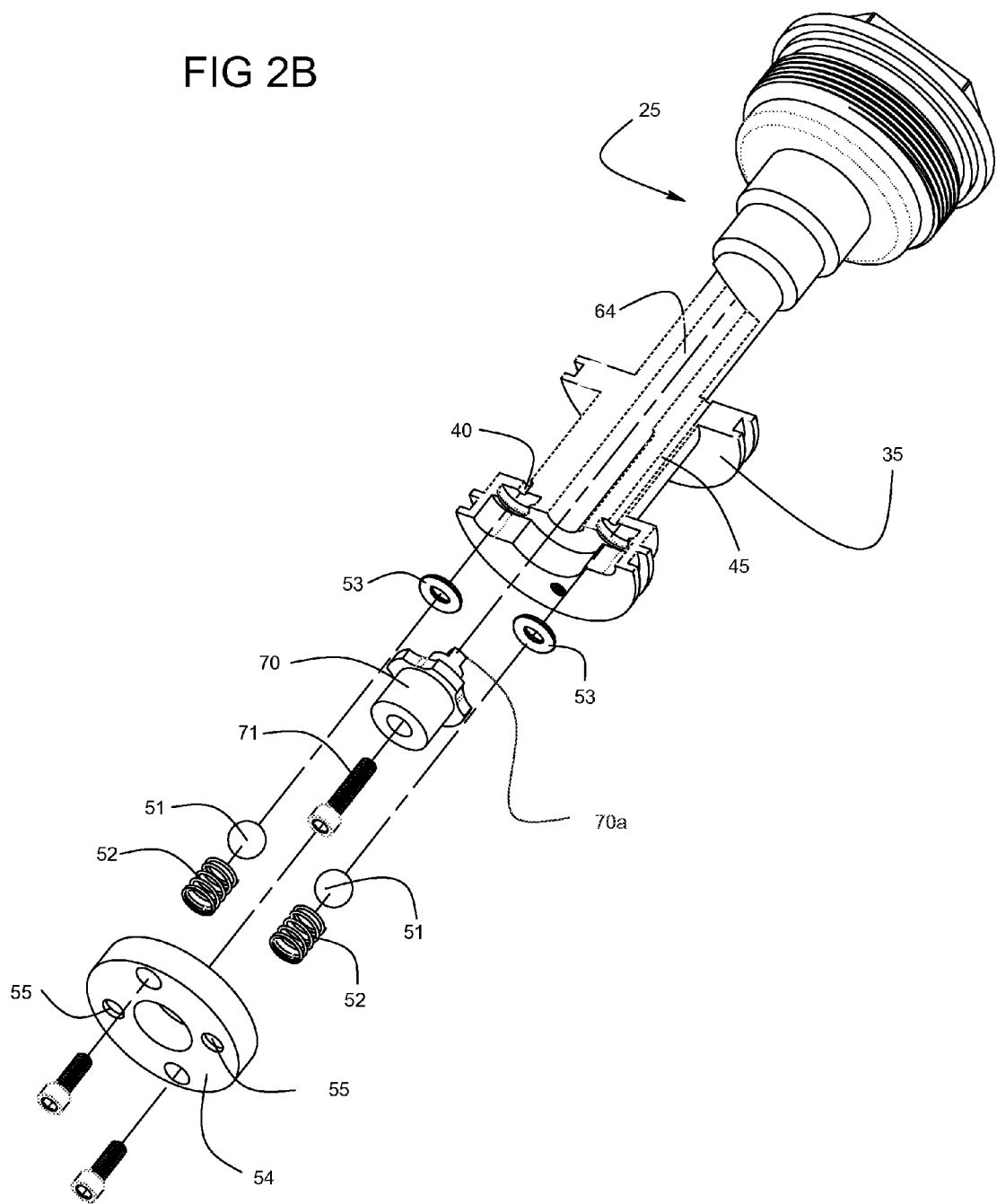
Figure 2C:
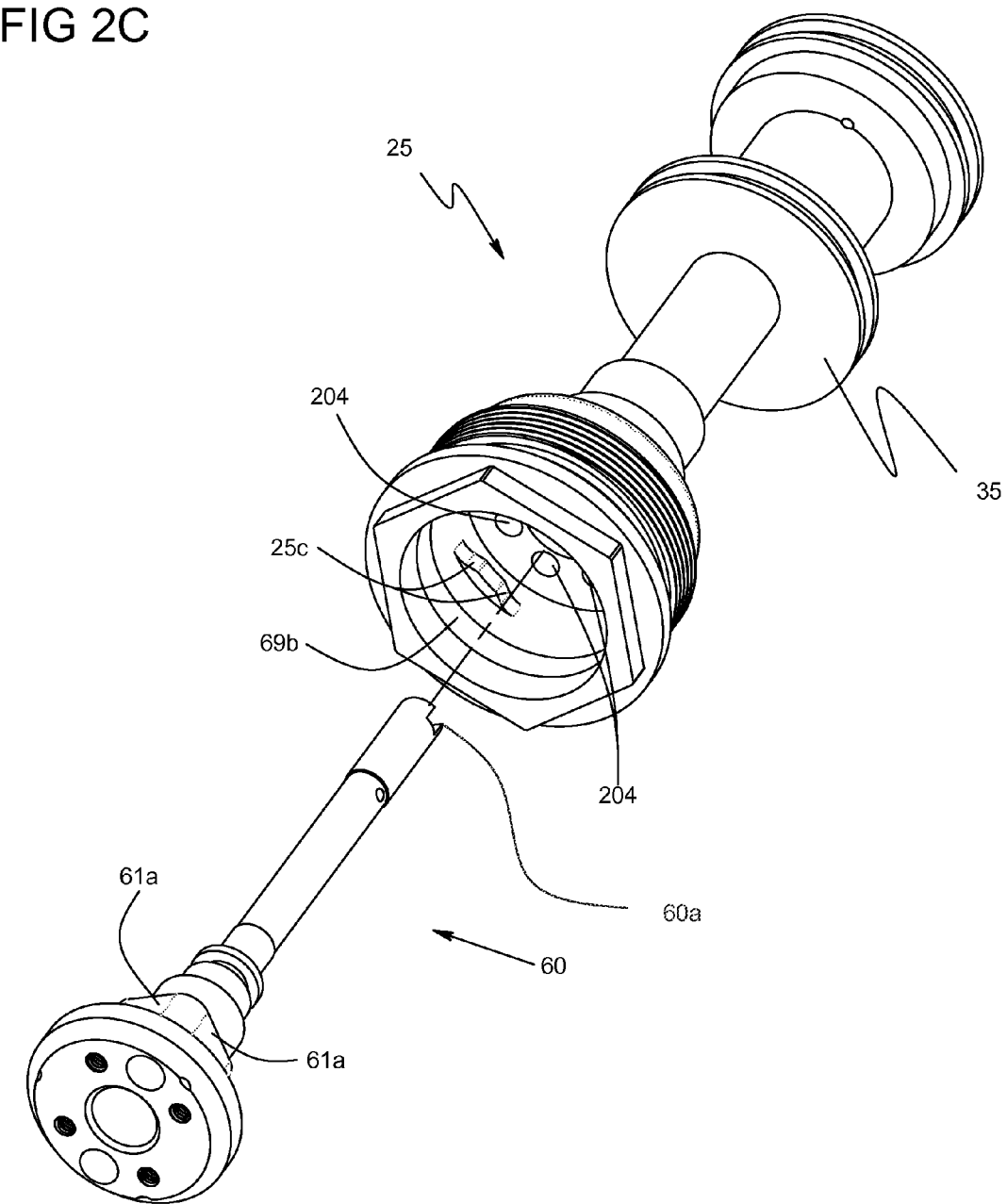

FIGS. 2A-D depict gas spring curve control valve 20 alone (FIG. 2A) and as various sub-assemblies (FIG. 2B-D). Housing 10 (FIG. 3) may comprise, for example, a reservoir cylinder, an upper portion of an upper leg of a suspension fork, a portion of a shock absorber, or a portion of any other gas-pressurized device, e.g., door arrestor, chair riser, etc. Housing 10 will typically be cylindrical and tubular and may be aligned in any orientation (e.g. horizontal, oblique, or vertical) and mounted to some structure with which it is associated in any conventional manner (e.g. eyelets, trunions, brackets, etc.). Housing 10 has an inner wall 10a and will have at least one open end 11. Furthermore, housing 10 will typically contain most of the working parts associated with the adjustable-volume gas-pressurized device 1, for example, when applicable, any of internal floating piston 3, piston 12, a portion of piston shaft 13, main gas chamber C, and the auxiliary gas chambers, e.g., A1, A2, which may be in-line.

Gas spring curve control valve 20 includes body portion 25 that may be screwed into open end 11 of housing 10 using threads 21 (FIG. 2A) to secure gas spring curve control valve 20 to housing 10 against the internal gas pressure of main gas chamber C. Body portion 25 of gas spring curve control valve 20 may include a first end 25a and a second end 25b connected to each other by hollow tubular portion 25'. These three elements may be formed from either a unitary or integral construction. Seals 26 prevent gas contained within the various gas chambers of housing 10 from leaking between chambers or out of housing 10 entirely. As described below, gas spring curve control valve 20 has a plurality of discrete settings for controlling whether the main chamber C operates alone, or in fluid communication with at least one, but preferably two or more, auxiliary gas chamber during a compression stroke. The operative setting is based on the user's selection from among the various available settings.

Figure 4A:
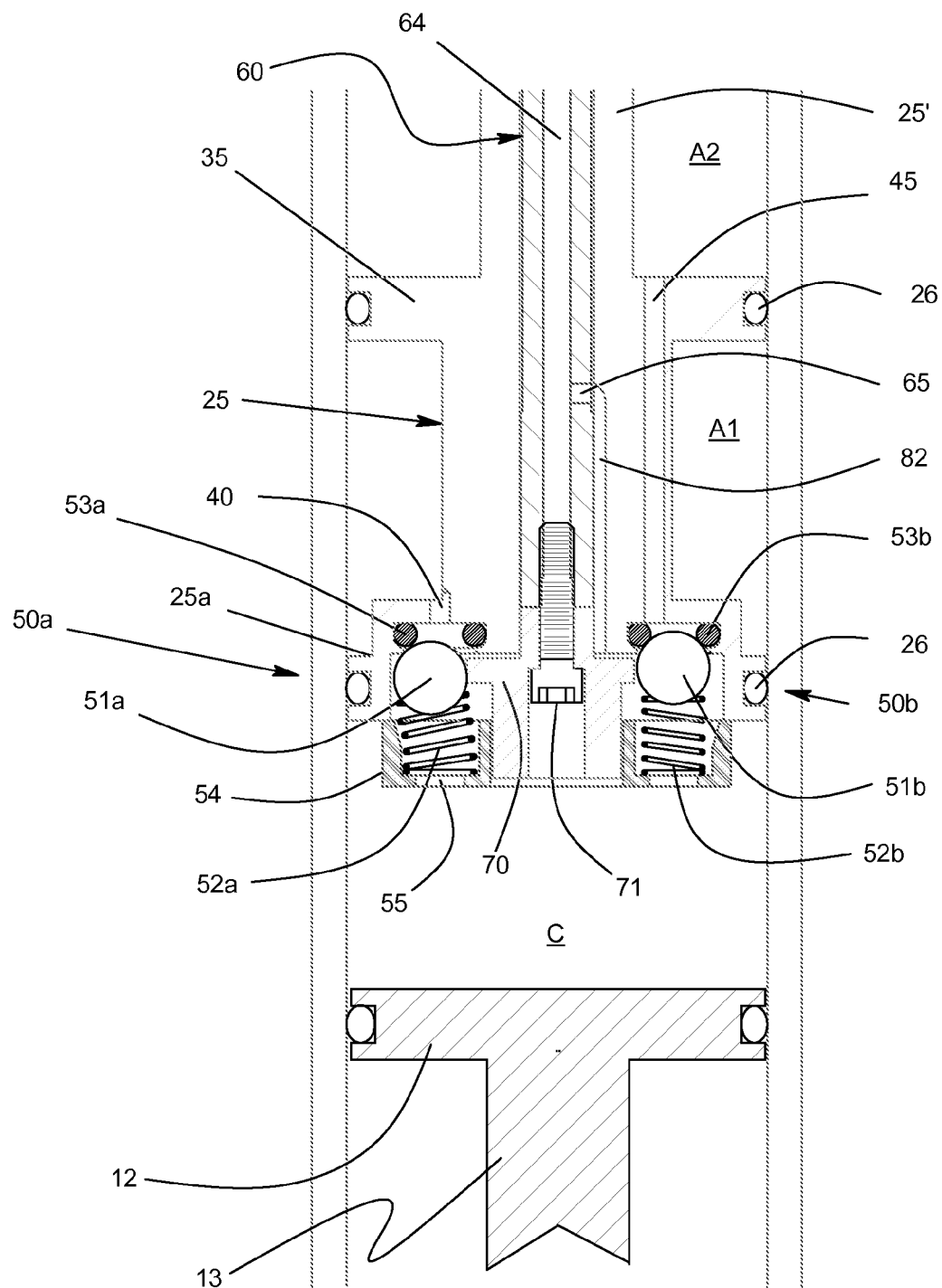
FIG. 4A is a view below line 4A-4A of FIG. 3.
Figure 5:
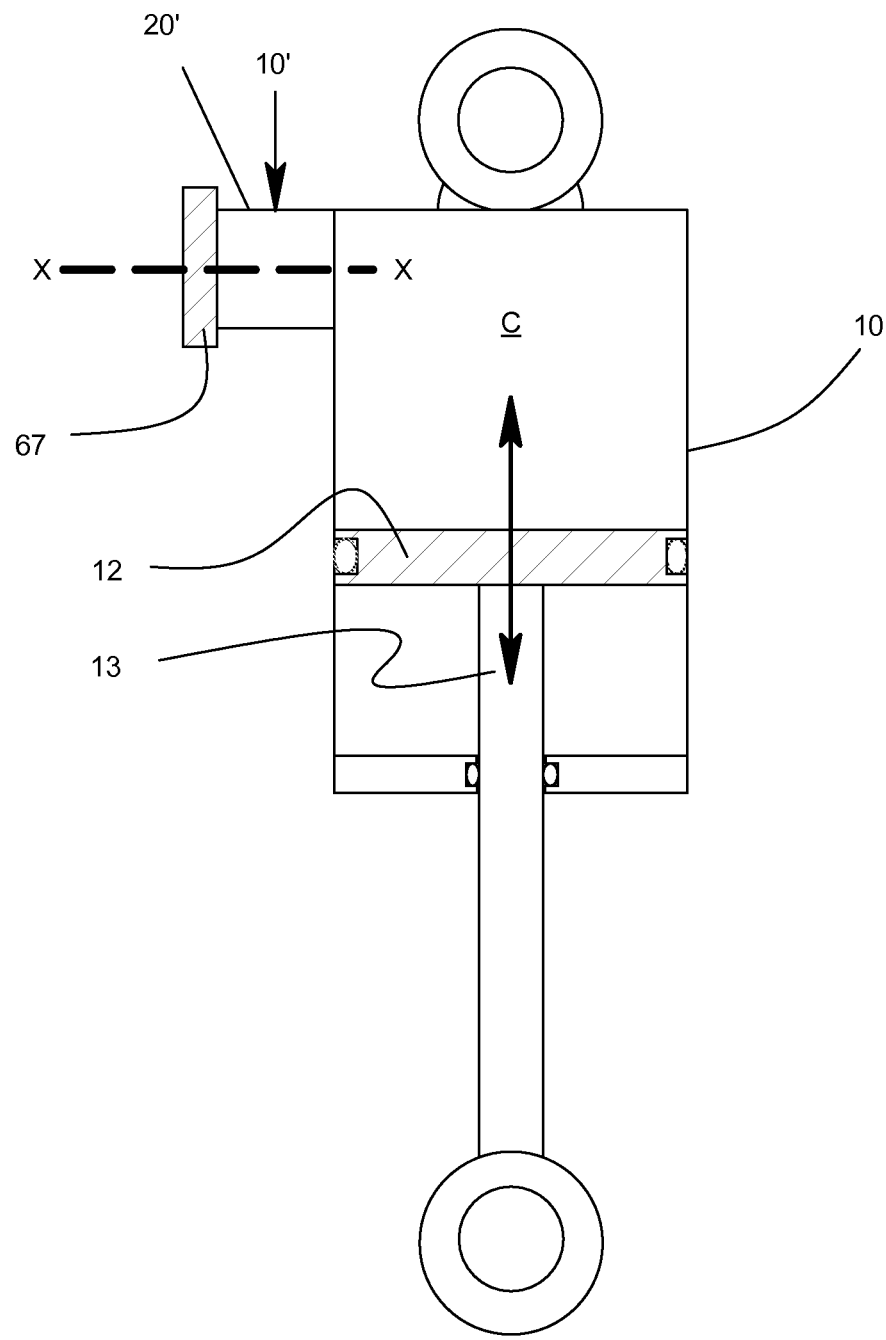
FIG. 5 depicts a highly schematic representation of a different positioning of the gas spring curve control valve relative to a generic adjustable-volume gas-pressurized device.
Figure 7A:
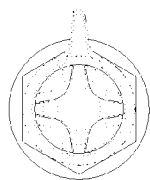
FIGS. 7A-D are views along lines 7A-7D of FIGS. 6A-D, respectively.
Figure 7B:
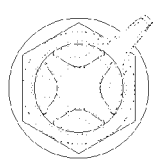
Figure 7C:
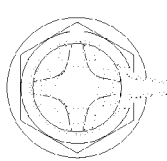
Figure 7D:
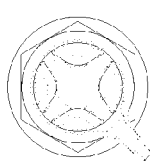
Figure 8A:
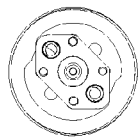
FIGS. 8A-8D are views along lines 8A-D of FIGS. 6A-D, respectively.
Figure 8B:
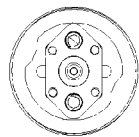
Figure 8C:
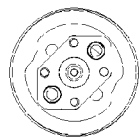
Figure 8D:
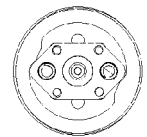

As shown in FIG. 3 and FIG. 4A, first end 25a of body portion 25 may define one end of main gas chamber C. In the exemplary embodiment of FIG. 3, the body portion 25 of gas spring curve control valve 20' is generally coaxial with piston shaft 13. In the alternative exemplary embodiment of FIG. 5, which highly schematically depicts a generic adjustable-volume gas-pressurized device, gas spring curve control valve 20' is positioned within a side valve housing 10' intermediate the ends of housing 10 of adjustable-volume gas-pressurized device 1 and having an axis X-X that may be perpendicular to piston shaft 13.

Returning to FIGS. 2A-D, 3, 4A, body portion 25 has at least one partition 35 positioned between ends 25a, 25b for dividing the volume between the ends 25a, 25b into two separate volumes, i.e., first auxiliary gas chamber A1, and second auxiliary gas chamber A2. Accordingly, portions of body portion 25 and the inner wall 10a of housing 10 at least partially define the first and second auxiliary gas chambers A1, A2. As described with respect to FIGS. 12, 13 below, any number of additional partitions 35 may be used to define additional auxiliary gas chambers. As one skilled in the art would recognize, the position of partition 35 relative to the first end 25a and the second end 25b determines the absolute and relative sizes of the auxiliary gas chambers with respect to each other and main gas chamber C and therefore the compression ratios/spring curves of the spring.

Valve Structure of an Exemplary Embodiment

Focusing now on FIGS. 2B and 4A, body portion 25 has a first gas flow port 40 for allowing the main gas chamber C and the first auxiliary gas chamber A1 to be placed in fluid communication. Body portion 25 has a second gas flow port 45 for allowing the main gas chamber C and the second auxiliary gas chamber A2 to be placed in fluid communication. As described above, when virtually instantaneous gas flow is desired through gas flow ports 40 and 45, the gas flow ports 40, 45 should be sized to provide virtually no restriction or throttling of gas flow. As an example, a flow port diameter of approximately 0.050" or larger could be used in an application of the current invention to a typical bicycle air spring front fork. When a slower gas flow is desired, the gas flow ports will be sized much smaller.

Gas spring curve control valve 20 may include ball valves 50a, 50b for controlling fluid communication between the main gas chamber C and the auxiliary gas chambers A1, A2, respectively, by selectively preventing gas flow from the main chamber C into first auxiliary chamber A1 or second auxiliary chamber A2 through the first and second gas flow ports 40, 45, when ball valves 50a, 50b are in their closed positions, or by selectively allowing the gas flow when ball valves 50a, 50b are in their open positions. In FIGS. 3, 4A, ball valve 50a is in its open position and ball valve 50b is in its closed position. As will be described below with respect to FIGS. 15-17, gas spring curve control valve 20 may include valve elements other than ball valves; for example, a rotary disc valve.

As shown in FIGS. 2B, 4A, ball valves 50a, 50b may comprise check balls 51a, 51b that are loaded by springs 52a, 52b against seals 53a, 53b to normally bias the ball valves 50a, 50b closed to prevent fluid communication from the main gas chamber C to the first and second auxiliary gas chambers A1, A2. Cap 54 retains springs 52 under compression. Cap 54 has large unobstructed gas flow openings 55. As described in our '144 application, the small bias forces produced by springs 52a, 52b, prevent unintended entrapment of excess gas and pressure in the auxiliary gas chambers A1, A2.

A rotor 60 (see also FIGS. 2A, 2C, 2D) is fixed to cam 70, which is associated with the first and second ball valves 50a. 50b such that rotation of the rotor 60 selectively opens both, one, or neither of the first and second ball valves 50a, 50b. Rotor 60 may comprise rotor head 61 (FIGS. 2D, 4B) and rotor tube 62 (FIGS. 2D, 4A) and may be constructed either as an integral or unitary structure. Rotor head 61 may include rotor stop flats 61a (FIG. 2D) that interact with body stop flats 25c (FIG. 2C) to limit the available rotation of rotor 60, as further described below.

Hollow tubular portion 25' of body portion 25 may receive rotor tube 62. Seal 63 (FIGS. 3, 4B) prevents gas leakage from adjustable-volume gas-pressurized device 1 from the gas spring control valve 20. Rotor tube 62 of rotor 60 defines a pressurization flow path 64 having an exit port 65, both of whose functions are described below, relative to pressurization of adjustable-volume gas-pressurized device 1. Adjustment knob 67 is associated with rotor 60 in any such manner, for example, using a screw 68, that allows rotation of adjustment knob 67 to control which, if any, of ball valves 50a, 50b are open. A plurality of ball bearings 69a rolling within race 69b (FIG. 2C) and spaced apart by elements 69c provide for a robust rotation platform that also has a very smooth feel to the user. Lever 67' gives a visual indication of the setting of adjustment knob 67. Adjustment knob 67 is positioned external to housing 10 and within the reach of the rider while in the riding position so that adjustment knob 67 may be quickly and simply directly manipulated by a user in an on-the-fly manner.

As shown in FIG. 4A, cam 70 is associated with rotor 60, such as by attachment to the lower end of rotor tube 62 using a fastener, such as a screw 71. Rotor slot 60a (FIGS. 2A, 2C, 2D) interlocks with cam tab 70a (FIGS. 2A, 2B) to assure there is no relative movement between rotor 60 and cam 70. Therefore, rotating rotor 60 also rotates cam 70. As shown in FIG. 4C, cam 70 has a number of lobes 72 and grooves 73 for selectively deflecting check balls 51 as rotor 60 and cam 70 are rotated. In FIG. 4C, check ball 51a is deflected and check ball 51b is not. Deflection of a check ball 51a, 51b results in the opening of the ball valve 50a, 50b associated with that check ball 51a, 51b. Thus, for example, in FIG. 4C, the deflection of check ball 51a away from its associated seal 53a creates a space 56 through which gas may into the first gas flow port 40 and from main gas chamber C to first auxiliary chamber A1. Lobes 72 and grooves 73 may be sized and angularly arranged around cam 70 to provide desired combinations of chambers in fluid communication.

Figure 6A:
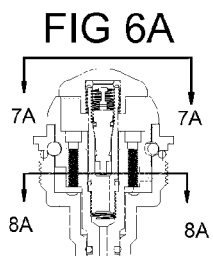
FIGS. 6A-D depict axial cross-section of the gas spring curve control valve according to the first embodiment of the invention in each of its available settings.
Figure 6B:
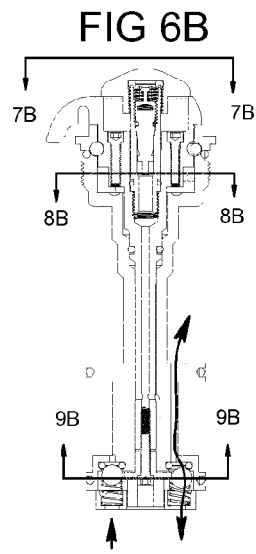
Figure 6C:
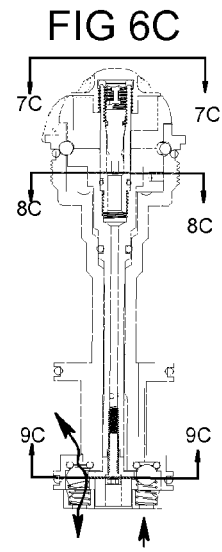
Figure 6D:
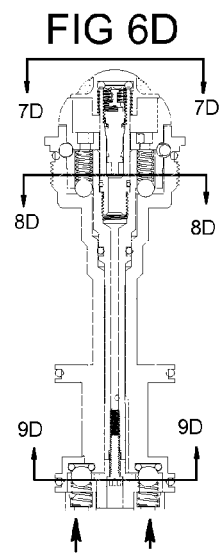
Figure 9A:
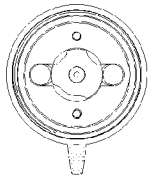
FIGS. 9A-9D are views along lines 9A-D of FIGS. 6A-D, respectively.
Figure 9B:
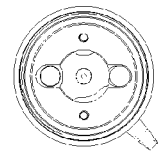
Figure 9C:
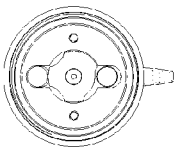
Figure 9D:
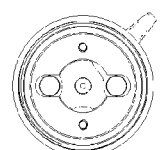

Referring now to FIGS. 6-9 (note that for clarity, housing 10 has been omitted from FIGS. 6A-6D), the operation and function of an exemplary embodiment of the invention having four discrete settings will be described:

1) As seen in FIGS. 6A-9A, when lever 67' is in a first setting, the cam 70 has deflected both of check balls 51a, 51b to their open positions. In this setting, two-way fluid communication between main gas chamber C and first and second auxiliary gas chambers A1, A2 is enabled;

2) As seen in FIGS. 6B-9B, when lever 67' is in a second setting, the cam 70 only deflects one of the check balls 51 to the open position (the check ball on the right side, as shown in FIGS. 6B and 9B). In this setting, as shown, there is two-way fluid communication between main gas chamber C and second auxiliary gas chamber A2, but no fluid communication from main gas chamber C to first auxiliary gas chamber A1;

3) As shown in FIGS. 6C-9C, when lever 67' is a third setting, the cam 70 only deflects the check ball on the left side to the open positions, as shown in FIGS. 6C and 9C. In this setting, as shown, there is two-way fluid communication from main gas chamber C to first auxiliary gas chamber A1, but no fluid communication from main gas chamber C to second auxiliary gas chamber A2; and 4) As seen in FIGS. 6D-9D, when lever 67' is in a fourth setting, the cam 70 does not engage either check ball 51a, 51b, and both check balls 51a, 51b are urged into closed positions by their respective springs 52. In this setting, as shown, any fluid communication between main gas chamber C and first and second auxiliary gas chambers A1, A2 is prevented.

As we discussed in our '144 application, it is preferable for adjustment knobs to be capable of manipulation quickly and simply by a user, many times during a ride. Therefore, in the '144 application, the adjustment knob needed only ¼ rotation to switch between the softer and stiffer spring curves available with that design. With the current invention, quick and simple manipulation of adjustment knob 67 by a user may be achieved by designing cam 70 such that the complete range of settings for gas spring curve control valve 20 may easily be achieved in less than ½ turn of adjustment knob 67. For example, in the preferred embodiment shown in FIGS. 6-9, the individual valve settings are approximately 45° apart, resulting in a total angular sweep of 135° covering all 4 discrete settings. Smaller angular increments (say 30° for giving a total sweep of 90°, for example), could easily be provided if desired. As described above, the end points for the rotation of adjustment knob 67 and rotor 60 relative to body portion 25 are limited by stop flats 61a and 25c (compare FIG. 8A with FIG. 8D).

These different gas spring curve control valve settings may be summarized as set forth in the table below.

TABLE ONE

| Valve 20 Setting | Exemplary Angular Position of Knob | Ball valve 50a | Ball valve 50b | Effective Total Volume Occupied By Gas | Exemplary Compression Ratio | FIG. |
|---|---|---|---|---|---|---|
| 1 | 0° | Open | Open | C + A1 + A2 | 3.9 | 6A-9A |
| 2 | 45° | Closed | Open | C + A2 | 4.6 | 6B-9B |
| 3 | 90° | Open | Closed | C + A1 | 5.3 | 6C-9C |
| 4 | 135° | Closed | Closed | C | 7.0 | 6D-9D |

Pressurization of the Gas Spring

Figure 4B:
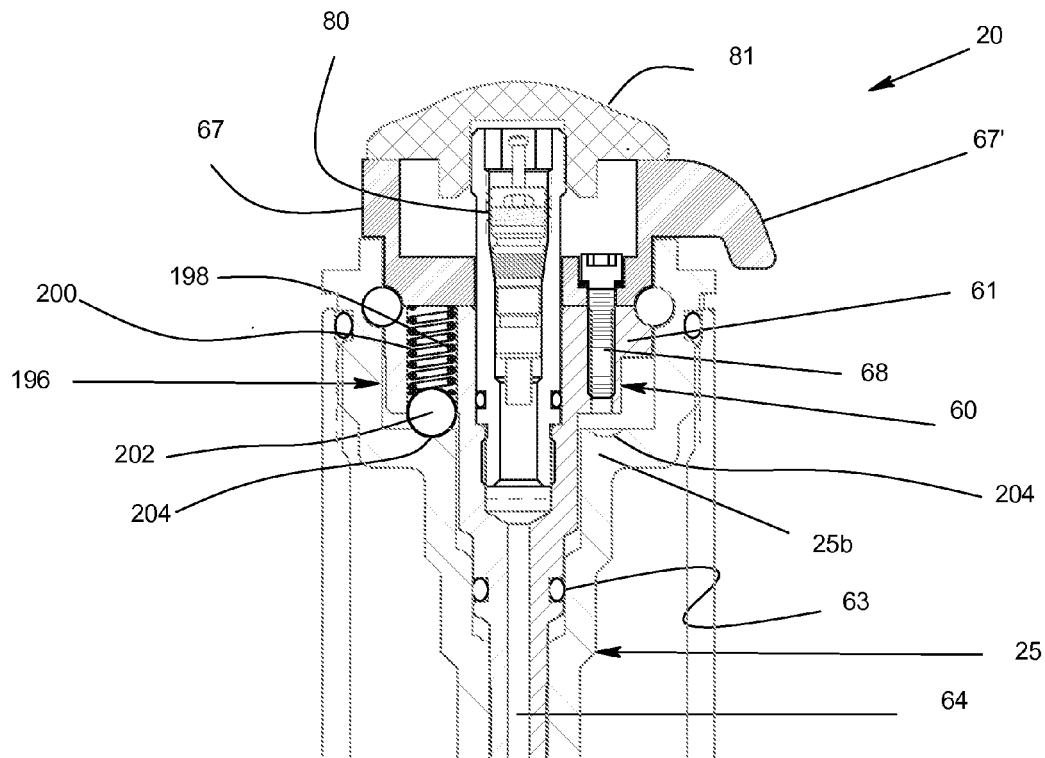
FIG. 4B is a view above line 4B-4B of FIG. 3.
Figure 4C:
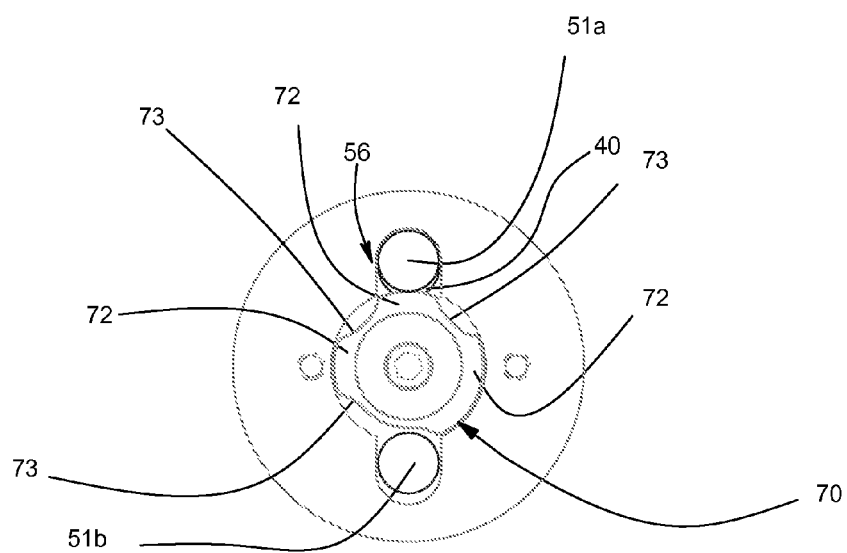
FIG. 4C is a view along line 4C-4C of FIG. 3.
Figure 10A:
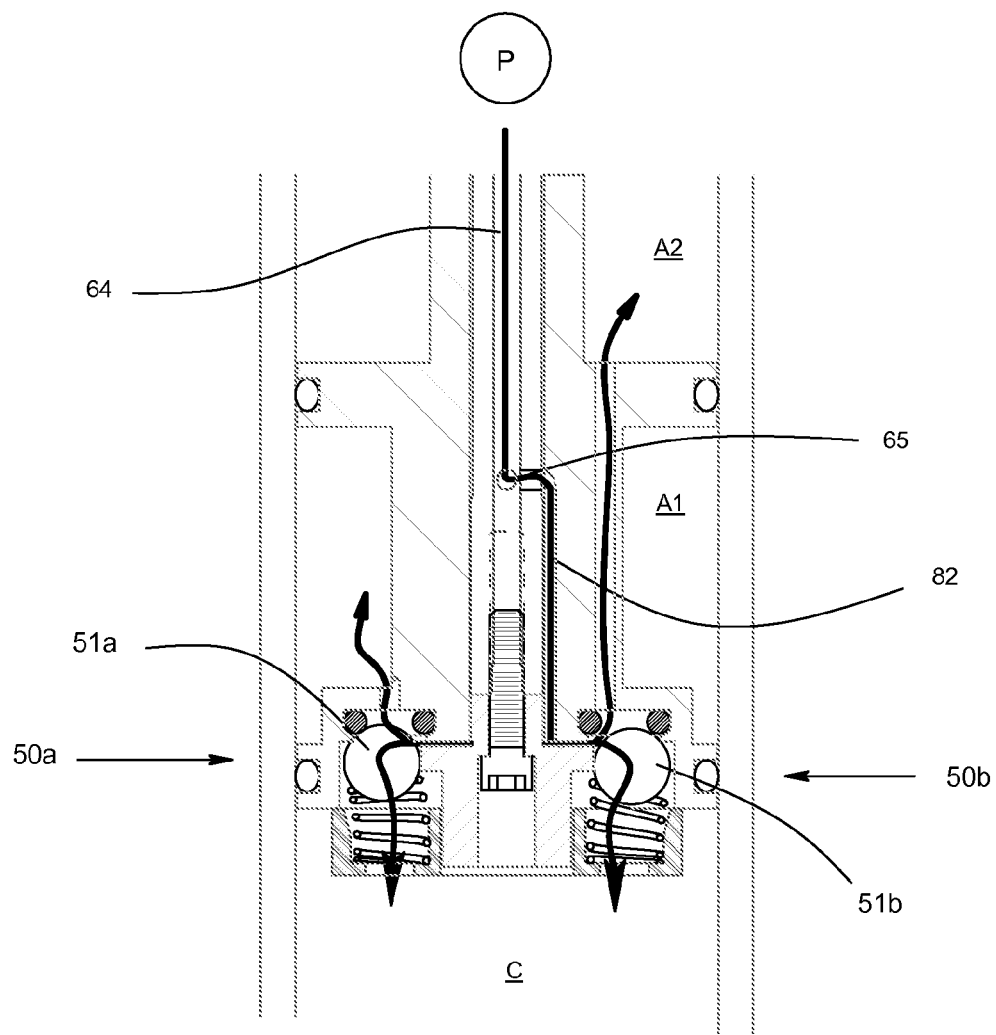
FIGS. 10A, 10B depict the pressurization of a generic adjustable-volume gas-pressurized device using the gas spring curve control valve according to the first embodiment of the invention.
Figure 10B:
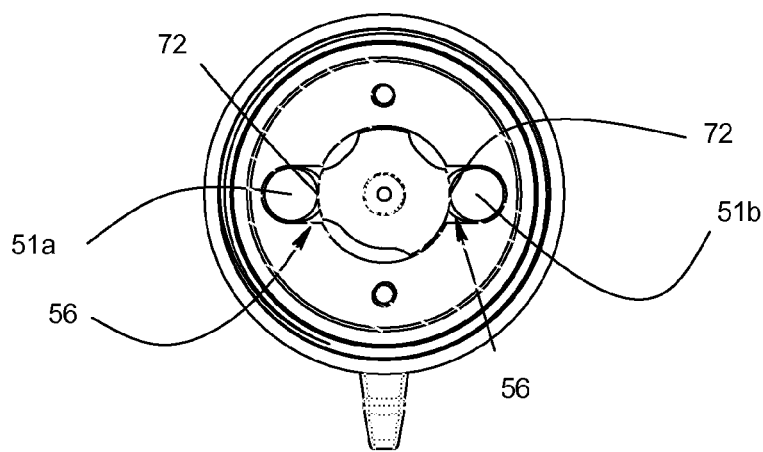

As shown in FIG. 4B, pressurization assembly 80, including a conventional Schrader valve, is placed in fluid communication with pressurization flow path 64. Pressurization assembly 80 may be protected by a removable cap 81. Pressurization of adjustable-volume gas-pressurized device 1 is shown in FIGS. 10A, 10B. As shown in FIG. 10A, the gas spring control valve 20 is first set to its setting where both ball valves 50a, 50b are open. Then, gas from a pressure source P, such as a conventional hand-operated pump is injected through pressurization assembly 80 and flows through pressurization flow path 64 and exit port 65 into pressurization channel 82 of body portion 25. Pressurized gas within pressurization channel 82 flows through the un-sealed spaces 56 between check balls 51 and cam 70 (FIG. 10B) and into the main gas chamber C. Additionally, because ball valves 50a and 50b are open, the incoming pressurized gas also fills auxiliary chambers A1, A2 and a constant gas pressure is communicated throughout all the various chambers of the gas spring.

Basic Method of Use

As described in our '144 application, the gas spring curve of a gas spring is determined by the volume of the gas subject to compression. The larger the volume, the softer the spring and the smaller the volume the stiffer the spring. We now apply this principle to the current invention.

When the lowest spring curve is desired for adjustable-volume gas-pressurized device 1, adjustment knob 67 is set by the user to the setting where both ball valves 50a, 50b are open (FIG. 6A-9A). Open ball valves 50a, 50b place main gas chamber C in fluid communication both first A1 and second auxiliary gas chamber A2 and the three gas chambers act as a single volume. Thus, because during movement of the piston 3 or 12 towards gas spring control valve 20, the total volume of gas contained within main gas chamber C and both auxiliary gas chambers A1, A2 are subject to compression, the lowest spring curve results.

When a stiffer spring curve is desired for adjustable-volume gas-pressurized device 1, adjustment knob 67 is set by the user to the setting where only ball valve 50b is open (FIG. 6B-9B). Open ball valve 50b places main gas chamber C and second auxiliary gas chamber A2 in fluid communication and the two gas chambers act as a single volume. In the exemplary embodiment of the invention, second auxiliary gas chamber A2 has a larger volume than first auxiliary gas chamber A1. Thus, because during movement of the piston 3 or 12 towards gas spring control valve 20, only the volume of gas contained within main chamber C and second auxiliary chamber A2 are subject to compression, a stiffer spring curve results.

When an even more stiff spring curve is desired for adjustable-volume gas-pressurized device 1, adjustment knob 67 is set by the user to the setting where only ball valve 50a is open (FIG. 6C-9C). Open ball valve 50a places main gas chamber C and first auxiliary gas chamber A1 in fluid communication and the two gas chambers act as a single volume. Thus, because during movement of the piston 3 or 12 towards gas spring control valve 20, only the volume of gas contained within main chamber C and first auxiliary chamber A1 are subject to compression, an even stiffer spring curve results.

When the stiffest spring curve is desired for adjustable-volume gas-pressurized device 1, adjustment knob 67 is set by the user to the setting at which both ball valves 50 are closed (FIG. 6D-9D). Thus, because during movement of the piston 3 or 12 towards gas spring control valve 20, only the volume of gas contained in the main gas chamber C is subject to compression, the stiffest spring curve results.

Applying the terminology of the '144 application as described above to this description of an exemplary embodiment of the invention, the first and second settings of gas spring control valve 20 may be associated with long travel applications and the third and fourth settings of gas spring control valve 20 may be associated with short travel applications. Furthermore, as can be seen from Table One, the exemplary compression ratios are smaller in long travel modes.

Additional Feature—Detent Assembly

As shown in FIG. 4B, gas spring curve control valve 20 may also include a detent assembly 196. Detent assembly 196 includes a spring 198 placed in a well 200 in rotor head 61 for biasing a ball bearing 202 into engagement with one of a plurality of recesses (detents) 204, formed on an inner surface of second end 25b of body portion 25 (FIG. 2C). The spring curve of the spring 198 is selected such that the biasing force of the spring 198 may be easily overcome so that the adjustment knob 67 may be turned by hand, while also providing positive feedback as to the relative position of the rotor head 61. Preferably, the number of detents 204 should correspond to the number of settings for gas spring curve control valve 20. Thus, according to the first exemplary embodiment of the invention, four (4) pairs of detents 204 may be provided, corresponding to the four settings for gas spring curve control valve 20 and a pair of ball bearings 202 (FIG. 2A).

Additional Feature—Remote Control

As described so far, adjuster adjustment knob 67 is manually and directly manipulated by the user at the adjustable-volume gas-pressurized device 1. However, direct and manual manipulation by the user at the adjustable-volume gas-pressurized device 1 is not required to vary the setting of gas spring curve control valve 20. As shown in FIG. 11, an externally positioned remote controller 310 or electronic controller 330 may be positioned anywhere. For example, when adjustable-volume gas-pressurized device 1 is associated with a bicycle, remote controller 310 or electronic controller 330 may be mounted on the handlebars 320.

FIG. 11 is a high-level block diagram schematically depicting alternative methods for adjusting the gas spring curve control valve 20. As shown in FIG. 11, a motive source M is associated with adjustment knob 67. Motive source M can comprise any conventional source of torque, including servo-motors and/or mechanical gear drives (neither shown). Motive source M may also be associated with a controller, for example:

(a) an electrical wire 252 for connecting motive source M to an externally positioned electronic remote controller 310;

(b) a mechanical cable 315 for connecting motive source M to an externally positioned mechanical remote controller 310'; and (c) an electronic controller 330, such as a CPU, receives control signals from one or more sensors 331a-c and sends control signals to motive source M. Sensors 331a-c may detect, such exemplary conditions as, vertical acceleration, speed, and inclination.

Alternative Exemplary Embodiment

Figure 12:
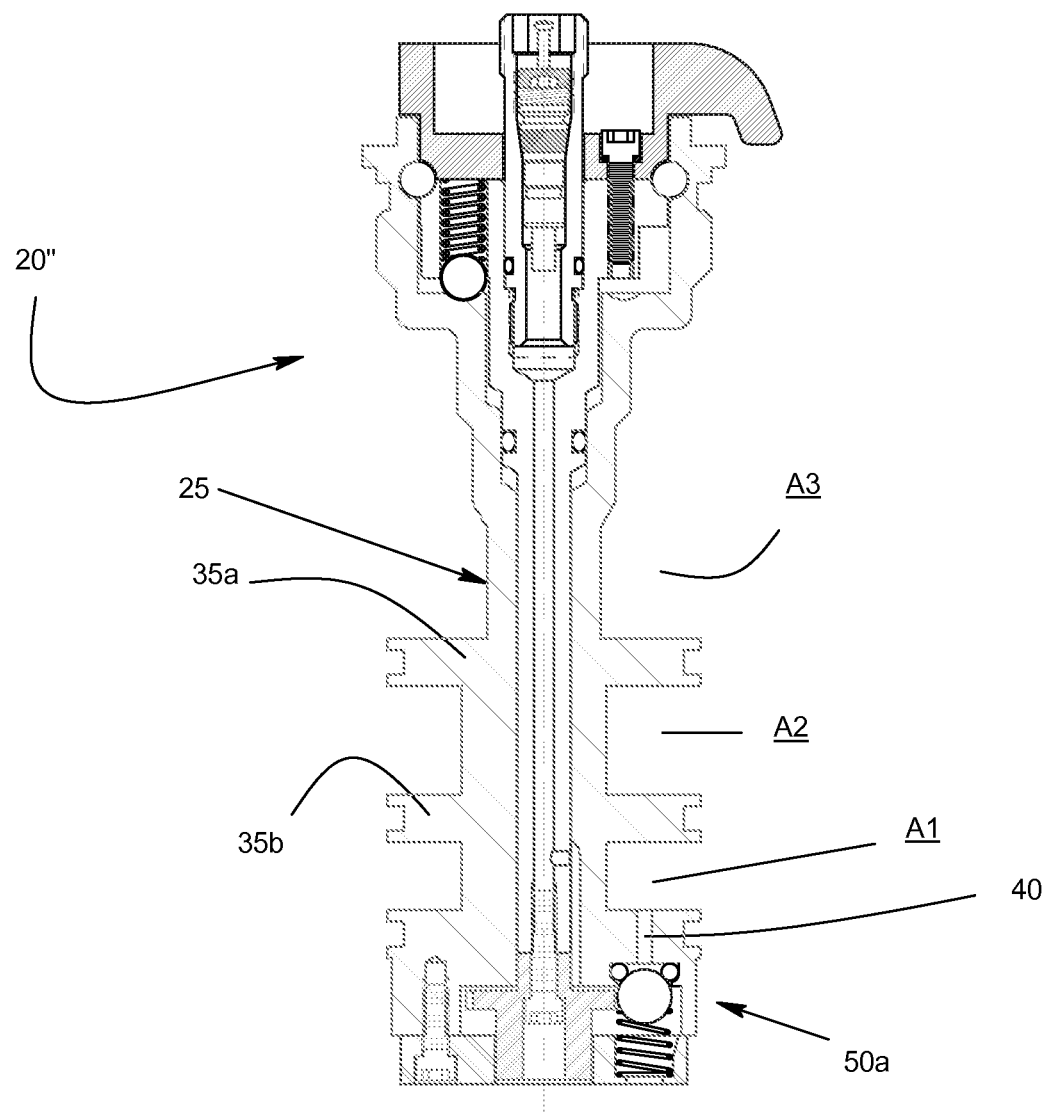
FIG. 12 depicts a gas spring curve control valve according to an alternative embodiment of the invention.
Figure 13A:
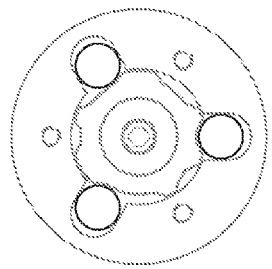
FIGS. 13A-F depict the ball valves of the gas spring curve control valve of FIG. 12 in each of its available positions.
Figure 13B:
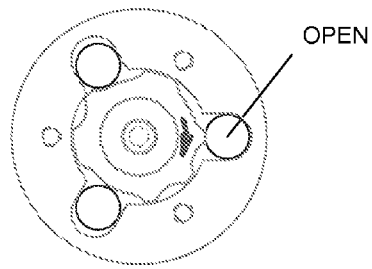
Figure 13C:
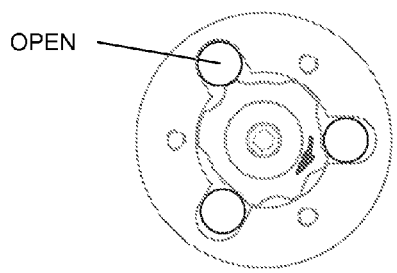
Figure 13D:
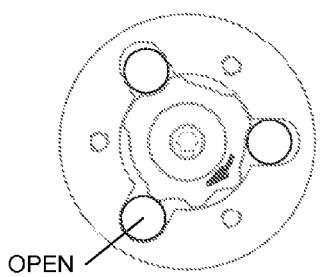
Figure 13E:
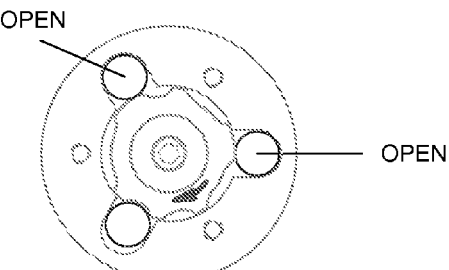
Figure 13F:
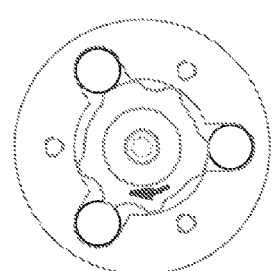

FIG. 12 depicts an alternative exemplary embodiment for adjustable-volume gas-pressurized device 1 and gas spring curve control valve 20". Reference numerals corresponding to technical features that remain basically unchanged from previous embodiments have been omitted for clarity.

In this configuration, body portion 25 includes first and second partitions 35a, 35b that together define three auxiliary gas chambers A1, A2, A3, of progressively larger volumes. Three check balls (FIGS. 13A-F—reference numerals omitted for clarity) interact with six cam lobes and six cam grooves to provide for six different settings of gas spring curve control valve 20. Ball valves 50 (only ball valve 50a is shown in FIG. 12) operate in the same manner as the previously described check balls to control fluid communication between main gas chamber C and auxiliary gas chambers A1, A2, A3. Note that in FIG. 12, only the gas flow port 40 between main gas chamber C and first auxiliary gas chamber A1 is shown, due to the plane of the section of FIG. 12. However, (not shown) separate gas flow ports between main chamber C and auxiliary gas chambers C1, C2, C3 are also provided and each are controlled by one of the ball valve as shown in FIGS. 13A-F. With this embodiment of the invention (with design of the cam 70 as shown in FIGS. 13A-13F), six different valve settings are available for selection by the user as shown in FIGS. 13A-13F, and that result in six different gas volumes/spring curves. However, it should be noted here that in many applications, such as bicycle forks, providing six or more setting may be more than desired for typical usage. While these six settings (which, as described above may also be referred to as travel modes) are summarized in the table below, the principles of the invention can be expanded to any number of auxiliary chambers.

TABLE TWO

| Valve 20 Setting | Exemplary Angular Position of Knob | First Ball Valve 50 | Second Ball Valve 50 | Third Ball Valve 50 | Effective Total Volume Occupied by Gas | FIG. |
|---|---|---|---|---|---|---|
| 1 | 0° | Closed | Closed | Closed | C | 13A |
| 2 | 20° | Open | Closed | Closed | C + A1 | 13B |
| 3 | 40° | Closed | Open | Closed | C + A2 | 13C |
| 4 | 60° | Closed | Closed | Open | C + A3 | 13D |
| 5 | 80° | Open | Open | Closed | C + A1 + A2 | 13E |
| 6 | 100° | Open | Open | Open | C + A1 + A2 + A3 | 13F |

It should be noted here that, although 6 discrete settings are illustrated in FIGS. 13A-13F, it is theoretically possible to design a cam configuration for the exemplary embodiment of FIG. 12 that would provide 2 additional discrete settings (8 total) for a device with 3 auxiliary chambers as shown. Specifically, in the Table above, note that based on the actual cam design shown, 2 potential additional combinations (C+A1+A3, and C+A2+A3) are not provided for. In general, as additional chambers are added, the total number of theoretically possible discrete combinations providing different total volumes rapidly increases. For example, for a device with a main chamber plus four auxiliary chambers A1, A2, A3, and A4, the total number of theoretical combinations providing different volumes is 16. This is mentioned for completeness. Again, for many applications, such a large number would be undesirable and impractical for typical usage

Alternative Exemplary Embodiment

Figure 14:
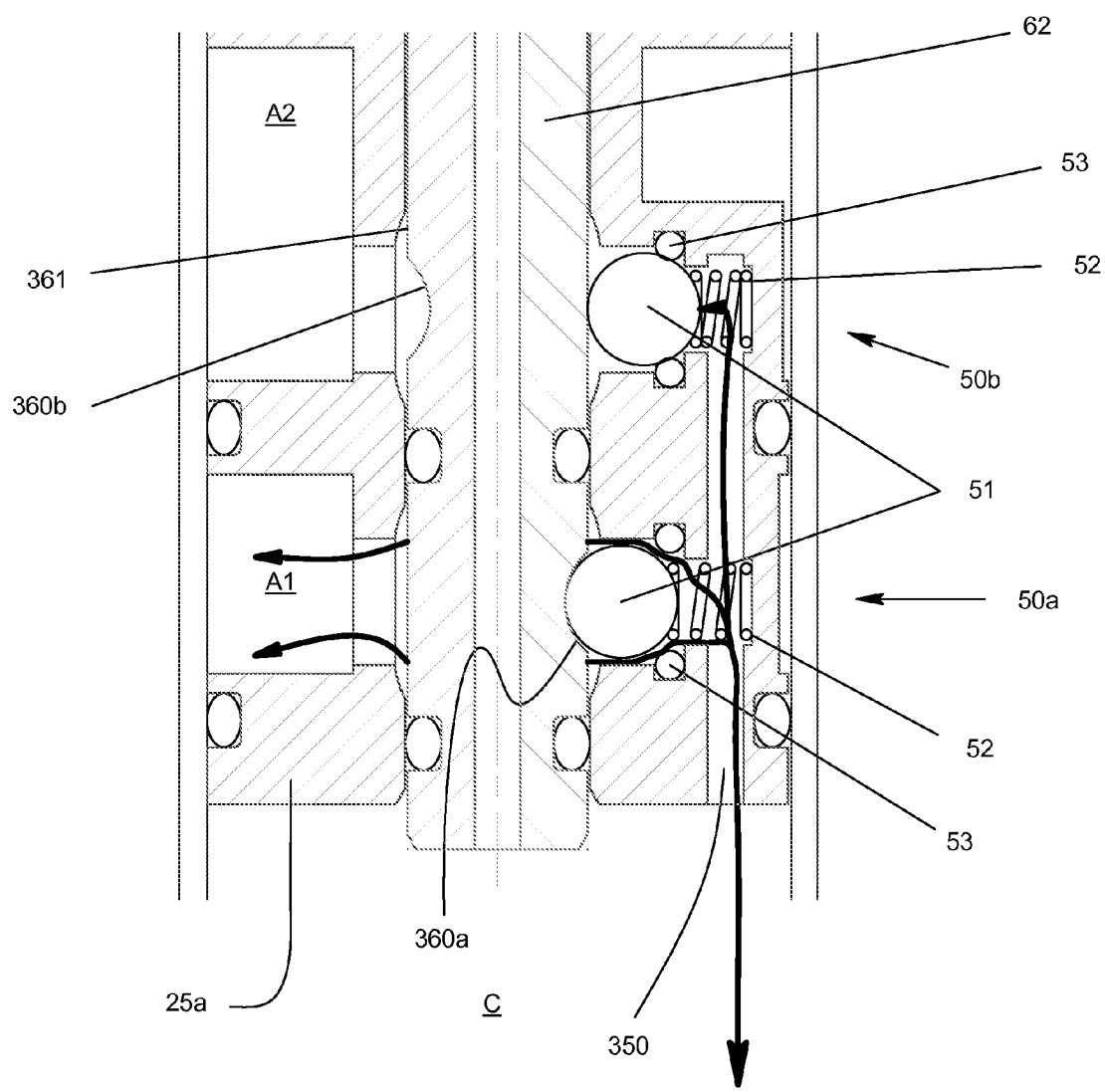
FIG. 14 depicts a portion of a gas spring curve control valve according to another alternative embodiment of the invention.

FIG. 14 represents a portion of another exemplary embodiment of the invention. Reference numerals corresponding to technical features that remain basically unchanged from previous embodiments have been omitted for clarity.

In this embodiment of the invention, first end 25a of body portion 25 has a main gas flow port 350 in fluid communication with first chamber C and ball valves 50a, 50b that are used to control the fluid communication between the main gas chamber C and the auxiliary gas chambers A1, A2.

As with prior embodiments of the invention, the opening and closing of ball valves 50a, 50b results from the rotation of rotor 60 (see other FIGS) and rotor tube 62. Rotor 60 and rotor tube 62 may be rotated by any previously described method (e.g. adjustment knob 67 or motive source M).

In this embodiment, however, rotor tube 62 has a plurality of angularly and/or longitudinally offset detents 360a, 360b on its surface 361.

To open a ball valve 50, rotor 60 is rotated to align a detent 360 with a check ball 51. This alignment allows spring 52 to partially extend and deflect check ball 51 into detent 360 and away from its valve seat/seal 53. Thus, there is two-way gas flow/communication between main gas chamber C and an auxiliary gas chamber, through main gas flow port 350. In FIG. 14, ball valve 50a is shown in the open position allowing gas flow between main gas chamber C and first auxiliary gas chamber A1 (as symbolized by the darkened lines/arrows) to allow the combined volume of gas contained within main gas chamber C and first auxiliary gas chamber A1 to be subject to compression, thereby lowering the gas spring curve of adjustable-volume gas-pressurized device 1.

To close a ball valve 50, rotor 60 is rotated such that a detent 360 will not be aligned with a check ball 51. This misalignment results in check ball 51 abutting the surface 361 of rotor tube 62 and being pressed radially into sealing contract with valve seal 53, which may, for example, be an o-ring. Since rotor tube 62 is fabricated from a rigid material such as aluminum, spring 52 will not deflect check ball 51 away from its valve seal 53. Thus, gas flow between main gas chamber C and an auxiliary gas chamber, through main gas flow port 350, is prevented. In FIG. 14, valve element 50b is shown in the closed position preventing gas flow between main gas chamber C and second auxiliary gas chamber A2.

According to this embodiment, detents 360 are aligned on the surface 361 of rotor tube 62 such that, as with the previous embodiments of the invention:

1) in a first setting, both valves are open;
2) in a second setting, one of the two valves is open;
3) in a third setting, the previously open valve is closed and the other valve is open; and
4) in a fourth setting, both valves are closed.

As with previous embodiments, more than two auxiliary gas chambers may be provided and less than one full rotation of rotor 60 by the rider allows access to all available gas spring curves. Furthermore, as with previous exemplary embodiments, both ball valves 50 should be open when the device is pressurized.

Finally, as opposed to the previous exemplary embodiments of the invention, in this exemplary embodiment, the pressure in the main gas chamber C tends to unseat check balls 51. Also, for completeness, we note here that this embodiment requires somewhat closer manufacturing tolerances than previous embodiments, in order to provide proper operation and sealing of the balls 51 with the seals 53. Whereas in the previous embodiments sealing in the valve-closed position was ensured by a positive pressure in the main chamber urging the balls into sealing contact with the seals, here proper tolerance control of the ball valve features is required to ensure mechanical contact and sealing.

Alternative Exemplary Embodiment

Figure 15A:
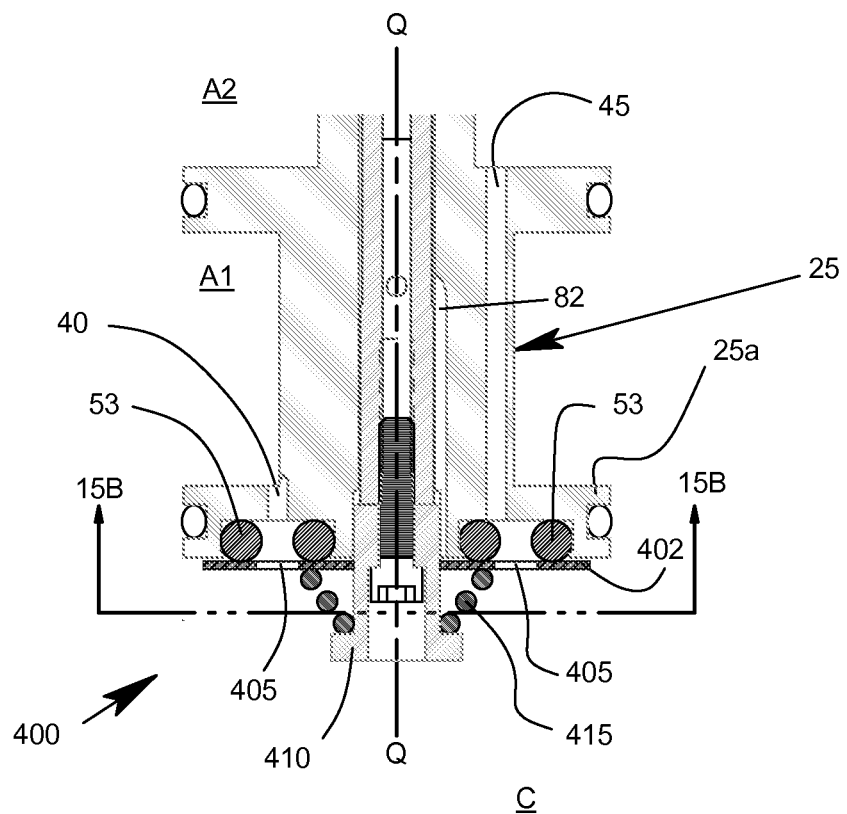
FIG. 15A depicts a portion of a gas spring curve control valve according to another alternative embodiment of the invention.
Figure 15B:
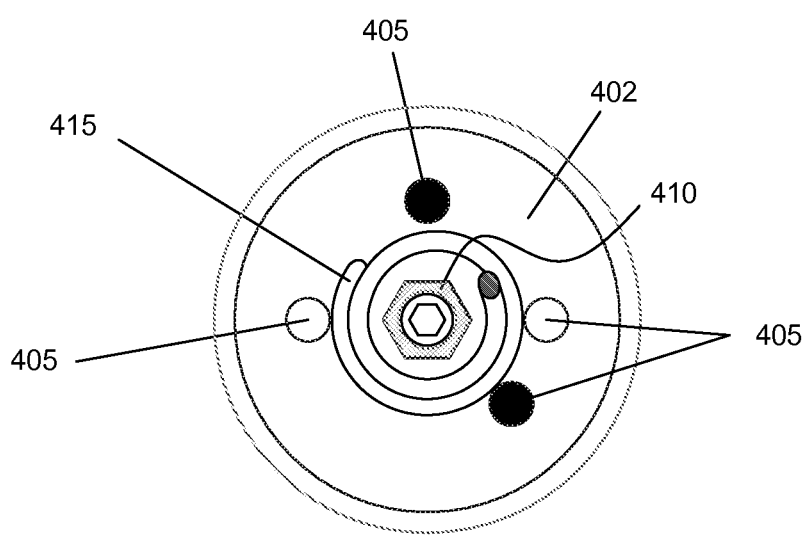
FIG. 15B is a view along line 15B-15B of FIG. 15A.

FIGS. 15A, 15B depict a portion of another exemplary embodiment of a gas spring control valve according to the invention. This exemplary embodiment is substantially the same as the embodiment shown, for example, in FIG. 3, except for the area of first end 25a of body portion 25. As shown in FIG. 15A, the ball valves of FIG. 3 have been replaced with a rotary disc valve assembly 400.

In particular, rotary disc valve assembly 400 includes a valve plate 402 having multiple gas flow ports 405 angularly aligned around rotational axis Q-Q as described below. Valve plate 402 rotates with knob 67 (not shown in this set of FIGS) due to valve plate 402 being keyed to fastener extension 410, such as by valve plate 402 having a hexagonal shaped cut-out (not shown) that interacts with a hexagonal shaped fastener extension 410. Light spring 415 biases valve plate 402 against seals 53. Therefore, when none of the gas flow ports 405 are aligned with flow ports 40, 45, there is no fluid communication between main chamber C and either of the auxiliary chambers A1, A2. However, during pressurization (as described above), the incoming pressurized gas flowing through pressurization channel 82 flows throughout the unsealed areas around valve plate 402 and into the various chambers C, A1, A2.

The operation of this exemplary embodiment is similar to operation of the previous embodiment shown in FIGS. 6A-9D, for example, in that four different settings are provided. These settings are shown in FIGS. 16 A-D and FIGS. 17A-D.

Using the convention with respect to FIGS. 17A-D that a filled circle represents a closed (blocked) gas flow port 405 that prevents gas flow and an empty circle represents an open (unblocked) gas flow port 405 that allows gas flow, gas flow ports 405 are angularly aligned about rotational axis Q-Q such that:

1) in a first setting (FIGS. 16A, 17A), both first and second flow ports 40, 45 are aligned with a gas flow port 405 and therefore, there is fluid communication between main chamber C and both of first and second auxiliary chambers A1, A2;

2) in a second setting (FIGS. 16B, 17B), second flow port 45 is aligned with a gas flow port 405 and therefore there is fluid communication between the main chamber C and second auxiliary chamber A2. First flow port 40 is not aligned with a gas flow port 405 and therefore there is no fluid communication between main chamber C and first auxiliary chamber A1;

3) in a third setting (FIGS. 16C, 17C), first flow port 40 is aligned with a gas flow port 405 and therefore there is fluid communication between the main chamber C and first auxiliary chamber A1. Second flow port 45 is not aligned with a gas flow port 405 and therefore there is no fluid communication between main chamber C and second auxiliary chamber A2; and 4) in a fourth setting (FIGS. 16D, 17D), neither of first and second flow ports 40, 45 are aligned with a gas flow port 405 and therefore, there is no fluid communication between main chamber C and either of first and second auxiliary chambers A1, A2.

Note that, with this alternate embodiment, somewhat closer manufacturing tolerances are required for this portion of the structure than for the embodiment of FIG. 3, in order to provide proper sealing between valve plate 402 and both of the seals 53. Additionally, valve plate 402 is preferably provided with a smooth, high-quality surface finish on the side contacting the seals 53. Also, each of the four gas flow ports 405 through the valve plate 402 are manufactured with smooth, rounded edges in order to prevent nicks or other damage to the seals 53 during rotation.

CONCLUSION

While the invention has been described with respect to certain exemplary embodiments, it is understood that many variations are apparent to one of ordinary skill in the art from a reading of the above specification and such variations are within the spirit and scope of the instant invention as defined by the following appended claims.

LIST OF REFERENCE NUMERALS USED

| | |
|---|---|
| A1, A2, A3 | auxiliary gas chambers |
| C | main gas chamber |
| M | motive source |
| P | pressure source |
| Q | axis |
| 1 | adjustable-volume gas-pressurized device |
| 2 | reservoir cylinder |
| 3 | internal floating piston |
| 10 | housing |
| 10a | inner wall of housing |
| 10' | valve housing |
| 11 | open end of housing |
| 12 | piston |
| 13 | piston shaft |
| 20, 20', 20" | gas spring curve control valve |
| 21 | threads |
| 25 | body portion |
| 25a, 25b | first and second ends of body portion |
| 25c | body stop flats |
| 25' | hollow tubular portion |
| 26 | seals |
| 35, 35a, 35b | partition |
| 40 | first gas flow port |
| 45 | second gas flow port |
| 50, 50a, 50b | ball valves |
| 51, 51a, 51b | check balls |
| 52, 52a, 52b | springs |
| 53, 53a, 53b | seals |
| 54 | cap |
| 55 | gas flow openings |
| 56 | space |
| 60 | rotor |
| 60a | rotor slot |
| 61 | rotor head |
| 61a | rotor stop flats |
| 62 | rotor tube |
| 63 | seal |
| 64 | pressurization flow path |
| 65 | exit port |
| 67 | adjustment knob |
| 67' | lever |
| 68 | screw |
| 69a | ball bearings |
| 69b | race |
| 69c | spacer |
| 70 | cam |
| 70a | cam tab |
| 71 | screw |
| 72 | cam lobes |
| 73 | cam grooves |
| 80 | pressurization assembly |
| 81 | removable cap |
| 82 | pressurization channel |
| 196 | detent assembly |
| 198 | spring |
| 200 | well |
| 202 | ball bearing |
| 204 | detents |
| 252 | wire |
| 310, 310' | remote controller |
| 315 | cable |
| 320 | handlebar |
| 330 | electronic controller |
| 331a, 331b, 331c | sensors |
| 350 | main gas flow port |
| 360, 360a, 360b | detents |
| 361 | rotor tube surface |
| 400 | rotary disc valve assembly |
| 402 | valve plate |
| 405 | flow port |
| 410 | fastener extension |
| 415 | spring |

The invention claimed is:

1. An adjustable-volume gas-pressurized device for a two-wheeled vehicle, comprising:
   a main gas chamber and at least first and second auxiliary gas chambers, the chambers containing a compressible gas;
   a gas spring curve control valve having a plurality of discrete settings for controlling whether different combinations of the main, first auxiliary and second auxiliary gas chambers are in communication;
   wherein the gas spring curve control valve comprises a first and second valve bodies housed in a first and second valves and a rotor for opening said first and second valves, thereby permitting simultaneous communication between the main and the at least first and second chambers.

2. The adjustable-volume gas-pressurized device of claim 1, wherein the communication between at least one of the different combinations of the main, first auxiliary and second auxiliary gas chambers comprises unrestricted communication.

3. The adjustable-volume gas-pressurized device of claim 1, wherein at least one of the first or second valves is a ball valve.

4. The adjustable-volume gas-pressurized device of claim 1 associated with a bicycle suspension fork.

5. The adjustable-volume gas-pressurized device of claim 1 associated with a bicycle shock absorber.

6. The adjustable-volume gas-pressurized device of claim 5, wherein the bicycle shock absorber includes a floating piston.

7. The adjustable-volume gas-pressurized device of claim 5, associated with a reservoir cylinder of a bicycle shock absorber.

8. An adjustable-volume gas-pressurized device, comprising:
   a housing, the housing at least partially defining a main gas chamber and at least partially defining first and second auxiliary gas chambers, the chambers containing a compressible gas;
   a gas spring curve control valve, at least partially within the housing, and having rotor coupled to a cam wherein rotation of the rotor rotates the cam into engagement with a first and second valve bodies to achieve a plurality of discrete settings for controlling whether different combinations of the main, first auxiliary and second auxiliary gas chambers are in communication.

9. The adjustable-volume gas-pressurized device of claim 8, wherein the communication between at least one of the different combinations of the main, first auxiliary and second auxiliary gas chambers comprises unrestricted communication.

10. The adjustable-volume gas-pressurized device of claim 8, wherein the discrete settings at least include:

a setting for preventing communication between the main gas chamber and both of the first and second auxiliary gas chambers;
a setting for allowing communication between the main gas chamber and only the first auxiliary gas chamber;
a setting for allowing communication between the main gas chamber and only the second auxiliary gas chamber; and
a setting for allowing communication between the main gas chamber and both of the first and second auxiliary gas chambers.

11. The adjustable-volume gas-pressurized device of claim 8, wherein the gas spring curve control valve includes:
a first end;
a second end;
a partition intermediate the first and second ends; and
the first auxiliary gas chamber is positioned between the first end of the gas spring curve control valve and the partition; and
the second auxiliary gas chamber is positioned between the second end of the gas spring curve control valve and the partition.

12. The adjustable-volume gas-pressurized device of claim 11, including:
at least another partition intermediate the first and second ends; and
the partitions at least partially define the first, the second, and a third auxiliary gas chambers; and
the discrete settings of the gas spring curve control valve further includes settings for preventing or allowing communication between the main and third auxiliary gas chambers.

13. The adjustable-volume gas-pressurized device of claim 10, wherein a setting of the gas spring curve control valve is made using a controller positioned externally of the gas spring.

14. The adjustable-volume gas-pressurized device of claim 13, wherein the controller positioned externally of the adjustable-volume gas-pressurized device includes a remote or electronic controller.

15. The adjustable-volume gas-pressurized device of claim 13, wherein the controller positioned externally of the adjustable-volume gas-pressurized device includes a knob.

16. The adjustable-volume gas-pressurized device of claim 8, wherein the housing forms at least a portion of a suspension fork leg.

17. The adjustable-volume gas-pressurized device of claim 8, wherein the housing forms at least a portion of a shock absorber.

18. The adjustable-volume gas-pressurized device of claim 8, wherein the housing forms at least a portion of reservoir cylinder of a shock absorber.

19. A gas spring curve control valve, comprising:
(a) a body portion for at least partially defining a main gas chamber and at least two auxiliary gas chambers, the chambers containing a compressible gas, the body portion including:
(1) a first flow port allowing communication between the main gas chamber and the first auxiliary gas chamber;
(2) a second flow port allowing communication between the main gas chamber and the second auxiliary gas chamber;
(b) first and second valves with first and second valve bodies for selectively controlling gas flow through the first and second gas ports and having open and closed positions;
(c) a rotor having a cam at an end thereof, the rotor associated with the first and second valves such that rotation of the rotor selectively opens or closes different combinations of the first and second valves.

20. The gas spring curve control valve of claim 19, wherein the communication between at least one of the different combinations of the main, first auxiliary and second auxiliary gas chambers comprises unrestricted communication.

21. The gas spring curve control valve of claim 19, wherein at least one of the first and second valves includes a spring-loaded ball valve.

22. The gas spring curve control valve of claim 21, wherein the spring biases the ball valve towards its closed position.

23. The gas spring curve control valve of claim 21, wherein the spring biases the ball valve towards its open position.

24. The gas spring curve control valve of claim 19, wherein:
the rotor includes a cam head having a plurality of cam lobes; and
rotating the rotor causes the cam lobes to open different combinations of the first and second valves.

25. The gas spring curve control valve of claim 24, wherein an adjustment knob is associated with the rotor such that rotation of the adjustment knob rotates the rotor.

26. The gas spring curve control valve of claim 25, wherein the adjustment knob is positioned to allow on-the-fly manipulation.

27. The gas spring curve control valve of claim 19, wherein:
the rotor further includes a surface having a plurality of angularly offset detents; and
rotating the rotor causes the angularly offset detents to open different combinations of the first and second valves.

* * * * *